US010330218B2

(12) United States Patent
Aizenberg et al.

(10) Patent No.: US 10,330,218 B2
(45) Date of Patent: Jun. 25, 2019

(54) FLUID-BASED GATING MECHANISM WITH TUNABLE MULTIPHASE SELECTIVITY AND ANTIFOULING BEHAVIOR

(71) Applicant: President and Fellows of Harvard College, Cambridge, MA (US)

(72) Inventors: Joanna Aizenberg, Boston, MA (US); Xu Hou, Somerville, MA (US); Mughees Khan, Belmont, MA (US); Alexander Tesler, Jerusalem (IL)

(73) Assignee: President and Fellows of Harvard College, Cambridge, MA (US)

( * ) Notice: Subject to any disclaimer, the term of this patent is extended or adjusted under 35 U.S.C. 154(b) by 120 days.

(21) Appl. No.: 15/549,991

(22) PCT Filed: Feb. 9, 2016

(86) PCT No.: PCT/US2016/017167
§ 371 (c)(1),
(2) Date: Aug. 9, 2017

(87) PCT Pub. No.: WO2016/130558
PCT Pub. Date: Aug. 18, 2016

(65) Prior Publication Data
US 2018/0023728 A1 Jan. 25, 2018

Related U.S. Application Data

(60) Provisional application No. 62/113,963, filed on Feb. 9, 2015.

(51) Int. Cl.
*F15C 1/02* (2006.01)
*F16K 99/00* (2006.01)

(52) U.S. Cl.
CPC .. *F16K 99/0017* (2013.01); *F16K 2099/0084* (2013.01)

(58) Field of Classification Search
CPC ............. F16K 99/0017; F16K 99/0015; F16K 99/0021; F16K 99/0025; F16K 2099/0084;
(Continued)

(56) References Cited

U.S. PATENT DOCUMENTS 5,843,767 A * 12/1998 Beattie ................. B01J 19/0046
435/287.1
6,030,829 A * 2/2000 Dannoux ................ C03B 11/06
220/501

(Continued)

FOREIGN PATENT DOCUMENTS

WO  WO-2014198939 A1  12/2014

OTHER PUBLICATIONS

International Search Report and Written Opinion dated Apr. 19, 2016, of International Application No. PCT/US2016/017167, International Filing Date Feb. 9, 2016 (12 pages).

*Primary Examiner* — Minh Q Le
(74) *Attorney, Agent, or Firm* — Wilmer Cutler Pickering Hale and Dorr LLP

(57) ABSTRACT

A gating mechanism that uses a capillary stabilized liquid as a reversible, reconfigurable gate that fills and seals pores in the closed state, and creates a non-fouling, liquid-lined pore in the open state is disclosed. Theoretical modeling and experiments demonstrate that for each transport substance, the gating threshold—the pressure needed to open the pores—can be rationally tuned over a wide pressure range. This enables realizing in one system differential response profiles for a variety of liquids and gases, even letting liquids flow through the pore while preventing gas from escaping. These capabilities allow dynamic modulation of gas-liquid sorting and to separate multi-phase mixtures, with the liquid lining ensuring sustained antifouling behavior. Because the liquid gating strategy enables efficient short-term and long-
(Continued)

term operation and can be applied to a variety of pore structures and membrane materials, and to nano, micro as well as macroscale fluid systems, the gating systems is useful in a wide range of applications.

28 Claims, 46 Drawing Sheets

(58) Field of Classification Search
CPC ....... F16K 2099/0092; B01L 3/502738; B01L 3/502753; B01L 3/502769; F15D 1/0055; F15C 1/06
USPC .... 137/247.15, 833, 827, 828; 422/507, 522
See application file for complete search history.

(56) References Cited

U.S. PATENT DOCUMENTS

| | | | |
|---|---|---|---|
| 6,051,190 A * | 4/2000 | Birch | B01L 3/0244 422/502 |
| 6,086,825 A * | 7/2000 | Sundberg | B01J 19/0093 204/600 |
| 6,102,897 A * | 8/2000 | Lang | A61M 5/16827 137/67 |
| 6,450,203 B1 * | 9/2002 | Backhouse | F15C 5/00 137/251.1 |
| 6,884,626 B1 | 4/2005 | Borrelli et al. | |
| 2001/0049149 A1 * | 12/2001 | Kennedy | B01J 19/0046 436/180 |
| 2004/0206658 A1 | 10/2004 | Hammerstedt et al. | |
| 2006/0243934 A1 * | 11/2006 | Chung | F16K 31/002 251/11 |
| 2007/0012371 A1 * | 1/2007 | Gravesen | A61M 5/141 138/46 |
| 2007/0113908 A1 * | 5/2007 | Lee | B01L 3/502738 137/833 |
| 2007/0144967 A1 * | 6/2007 | Guenther | B01D 17/045 210/634 |
| 2008/0101971 A1 * | 5/2008 | Mayer | F04B 19/006 417/533 |
| 2009/0183871 A1 | 7/2009 | Salamitou et al. | |
| 2009/0282978 A1 * | 11/2009 | Jensen | B01D 63/087 95/241 |
| 2011/0083964 A1 * | 4/2011 | Ulmanella | B01L 3/50273 204/643 |
| 2013/0078711 A1 | 3/2013 | Chen et al. | |
| 2013/0122539 A1 * | 5/2013 | Li | B01D 67/0062 435/34 |
| 2015/0238966 A1 * | 8/2015 | Berndt | B01L 3/0262 436/179 |
| 2016/0346466 A1 * | 12/2016 | Wang | A61M 5/14248 |
| 2018/0003319 A1 * | 1/2018 | Besse | F16K 99/0038 |
| 2018/0258461 A1 * | 9/2018 | Dovichi | C12Q 1/24 |

* cited by examiner $\Delta P < P_{threshold\,(gas)} < P_{threshold\,(liquid)}$ $P_{threshold\,(gas)} < \Delta P < P_{threshold\,(liquid)}$ $P_{threshold\,(gas)} < P_{threshold\,(liquid)} < \Delta P$ $P_{threshold\,(gas)} < P_{threshold\,(liquid)} << \Delta P$ $\Delta P < P_{threshold\ (gas)} < P_{threshold\ (liquid)}$ $P_{threshold\ (gas)} < \Delta P < P_{threshold\ (liquid)}$ $P_{threshold\ (gas)} < P_{threshold\ (liquid)} < \Delta P$ $P_{threshold\ (gas)} < P_{threshold\ (liquid)} << \Delta P$

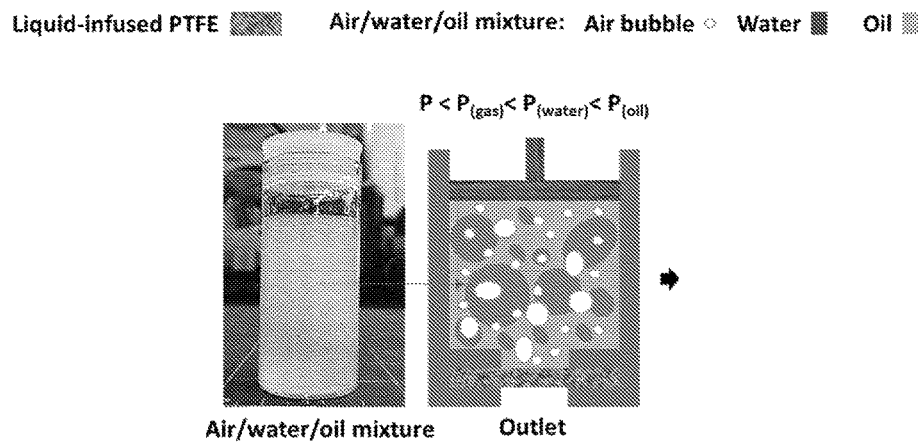
FIG. 8A
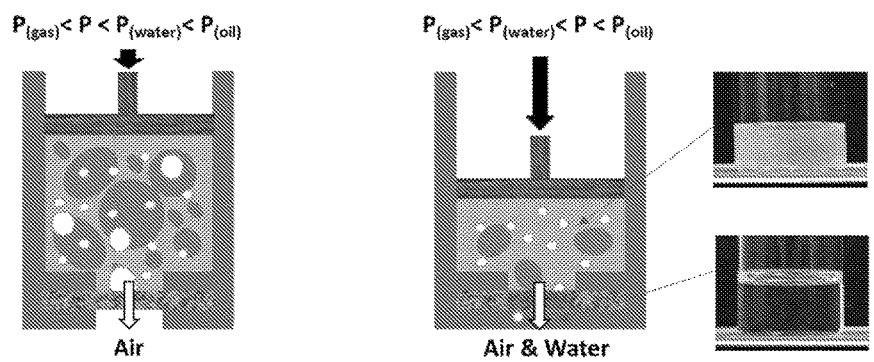
FIG. 8B
FIG. 8C

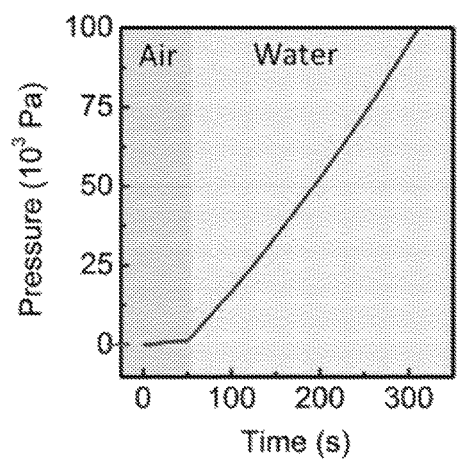
FIG. 28C
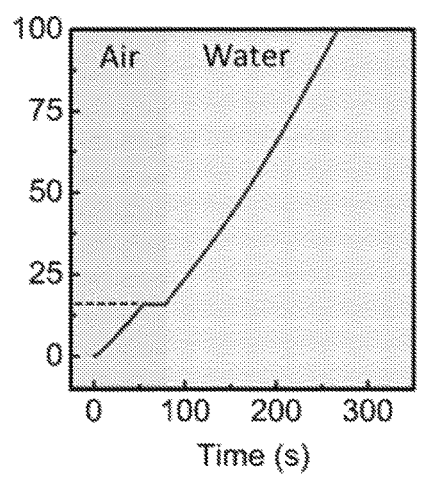 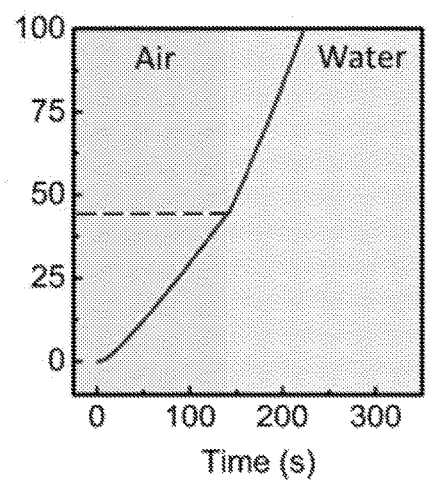
FIG. 28D                FIG. 28E

FIG. 29A
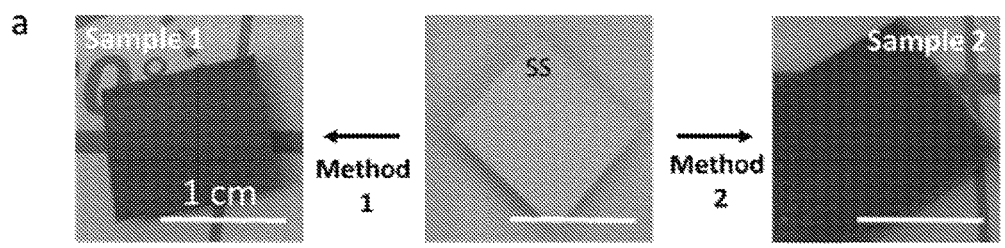
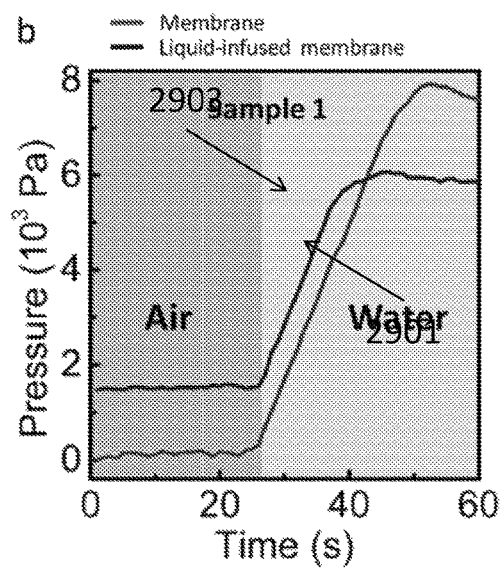
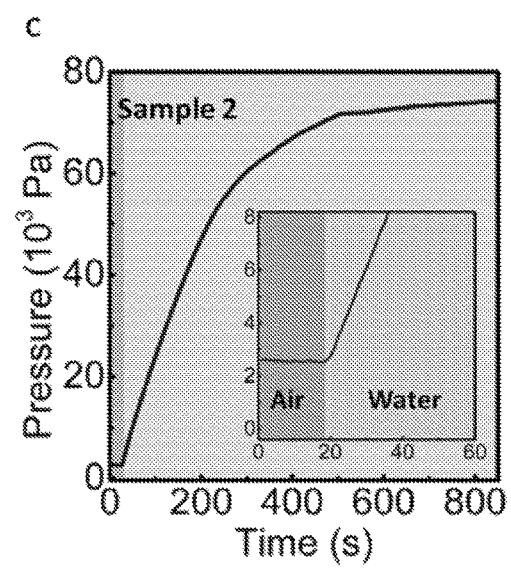
FIG. 29B          FIG. 29C

FLUID-BASED GATING MECHANISM WITH TUNABLE MULTIPHASE SELECTIVITY AND ANTIFOULING BEHAVIOR

CROSS REFERENCE TO RELATED APPLICATION

This application is a National Stage Entry of PCT International Application No. PCT/US2016/017167 filed on Feb. 9, 2016, which claims priority to U.S. Patent Application 62/113,963 filed on Feb. 9, 2015, which is hereby incorporated by reference in its entirety.

STATEMENT REGARDING FEDERALLY SPONSORED RESEARCH OR DEVELOPMENT

The present invention was made with United States government support under Grant No. DE-AR0000326 awarded by the ARPA-E, Department of Energy. The United States government may have certain rights in this invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present application relates to fluid-based gating methods. More particularly, the present application relates to fluid-based gating methods having tunable multiphase selectivity and antifouling behavior.

BACKGROUND

Porous systems (e.g., micropores or nanopores) in living organisms have evolved to extract fluids, vapors, and solids from soil, air, and ocean, sort them among internal compartments to control buoyancy, pressure, body patterning, sensing and metabolic cascades, and eliminate wastes, toxins, and pathogens.

In synthetic systems, a single system capable of complex multiphase selectivity and control has not been achieved, and fouling is nearly inevitable. Currently, many synthetic pore designs rely on static gating by precisely tailored chemistry, geometries, molecular fitting, and/or layering. To make transport responsive and controllable, active gates are designed to open and close the pores: polymers lining the pathway extend and recoil, hydrogel plugs swell and contract, "ball and chain" or "plunger" elements enter and exit, or elastomeric lids flex up and down. Yet for most systems, the need to balance surface chemistry and size requirements makes it difficult to differentially tune the behavior of multiple substances at once, and highly specific molecular pathways are observed only for pure liquid. The material requirements of responsive gates can further constrain options, and, for any nano/microscale transport, fouling is a universal problem that imposes another set of size and chemical considerations.

FIG. 30 shows a conventional pore (e.g., nanopore or micropore, which is significantly larger than molecular scale) in a solid material.

In such conventional pore systems, gas will flow through passively (i.e., the threshold pressure for gas ($P_{threshold(gas)}$) is zero) regardless of shape and surface chemistry (see left of FIG. 30). In other words, transport of gases (left) is uncontrolled and can occur even at zero differential pressure. As used in the present disclosure, the "pressure" discussed herein refers to the pressure differential across the pore systems as compared to the pressure of the environment. For example, if operating under atmospheric conditions, zero pressure means that no additional differential positive or negative pressure is applied to the system, but the system is operating under atmospheric conditions.

Moreover, in conventional pore systems, liquid will deform and enter the pore as dictated by the balance of surface interactions, geometry, surface tension, and pressure (see right of FIG. 30). Specifically, liquids will enter and pass through the pore at an absolute threshold pressure that is greater than zero (i.e., $|P_{threshold(liquid)}|>0$).

Moreover, while the liquid is flowing and even after the pressure is removed and the flow stops, some residual amounts of the liquid is shown to stick onto the pore surface and the system is prone to fouling.

SUMMARY

A new, unified gating concept that integrates responsive pore opening/closing with broad multiphase discrimination and antifouling behavior is described. The pore can be filled with a capillary-stabilized fluid that seals the pore in the closed state but reversibly reconfigures under pressure to create a non-fouling, fluid-lined pore in the open state. The gating threshold can be rationally tuned over a wide range to generate differential response profiles for a variety of liquids and gases in one system, even enabling liquids to flow while preventing gas escape. The pores rapidly and repeatedly open and close, enabling precise, dynamic modulation of gas/liquid sorting in a microfluidic flow and controllable separation of a three-phase air/water/oil mixture, and the system shows non-fouling transport of complex solutions and suspensions such as proteins and blood. Integrating tunable pressure with sustained antifouling behavior enables >50% energy savings in long-term operation. The gating strategy can be applied to a variety of pore structures, material chemistries, and nano/micro/macroscale systems, allowing complex sorting in environmental, fuel, biomedical, microfluidics, 3D-printing, and other applications to be achieved.

In accordance with certain embodiments, a gating membrane device is disclosed. The device includes a membrane that has a plurality of pores, wherein at least one pore of the plurality of pores has a continuous path that traverses a thickness of the membrane, the membrane positioned and arranged to permit a transport fluid to traverse the membrane thickness. The device further includes a wetting liquid filling the at least one pore of the plurality of pores. In certain embodiments, the wetting liquid partially displaces above a threshold pressure applied across the at least one pore to allow transport of the transport fluid through the membrane while contacting the wetting liquid. In certain embodiments, the wetting liquid is selected to be immiscible with the transport fluid. In certain embodiments, the wetting liquid refills the at least one pore and gate transport of the transport fluid across the membrane below the threshold pressure.

In accordance with certain embodiments, method for transporting a fluid across a membrane is disclosed. The method includes providing a membrane comprising a plurality of pores and a wetting liquid, wherein at least one pore of the plurality of pores has a continuous path that traverses a thickness of the membrane, wherein the membrane is positioned and arranged to permit a transport fluid to traverse the membrane thickness, wherein the wetting liquid fills the at least one pore of said plurality of pores, and wherein the wetting liquid is selected to be immiscible with the transport fluid. In certain embodiments, the method includes applying a pressure above a threshold pressure across the membrane to displace the wetting liquid in said at least one pore and to transport the transport fluid through the membrane, wherein the transport fluid contacts the wetting liquid. In certain embodiments, the method includes lowering the pressure to a pressure below the threshold pressure to allow the wetting liquid to refill the at least one pore.

In accordance with certain embodiments, the membrane is a polymer, a ceramic, a composite or a metal.

In accordance with certain embodiments, the device further includes an inlet and an outlet.

In accordance with certain embodiments, the membrane includes a fluidic channel.

In accordance with certain embodiments, the fluidic channel is a nanofluidic or microfluidic or a macrofluidic channel.

In accordance with certain embodiments, the device further includes an inlet connected to the fluidic channel, an outlet connected to the fluidic channel, and a relief port.

In accordance with certain embodiments, the plurality of pores includes an average pore size that ranges from 10 nm to 100 microns.

In accordance with certain embodiments, the wetting liquid is immiscible with the transport fluid.

In accordance with certain embodiments, the wetting liquid has a higher affinity to the porous membrane than the transport fluid.

In accordance with certain embodiments, the transport fluid includes a mixture of different phases that traverse the membrane at different threshold pressures.

In accordance with certain embodiments, the gating membrane device is antifouling.

In accordance with certain embodiments, the transport fluid transports through the membrane without contacting the surfaces of the membrane defining the plurality of pores.

In accordance with certain embodiments, the wetting liquid covers at least a portion of the top and bottom surfaces of the membrane.

In accordance with certain embodiments, the wetting liquid is disposed within the membrane.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 6A-6D, FIGS. 7A-7D and FIGS. 8A-8C show gating systems utilizing wetting liquid-filled porous membrane that allows separation of components in a transport fluid in accordance with certain embodiments;

FIG. 6. 16 shows plots of threshold pressure for wetting liquid-filled porous membrane demonstrating consistent behavior over repeated uses in accordance with certain embodiments;

FIGS. 28C-28E show the pressure for different pore sizes of the wetting liquid-filled porous membranes in accordance with certain embodiments;

FIGS. 29A to 29C show behavior of two different wetting liquid-filled porous membranes in accordance with certain embodiments.

DETAILED DESCRIPTION OF THE INVENTION

Figure 1A:
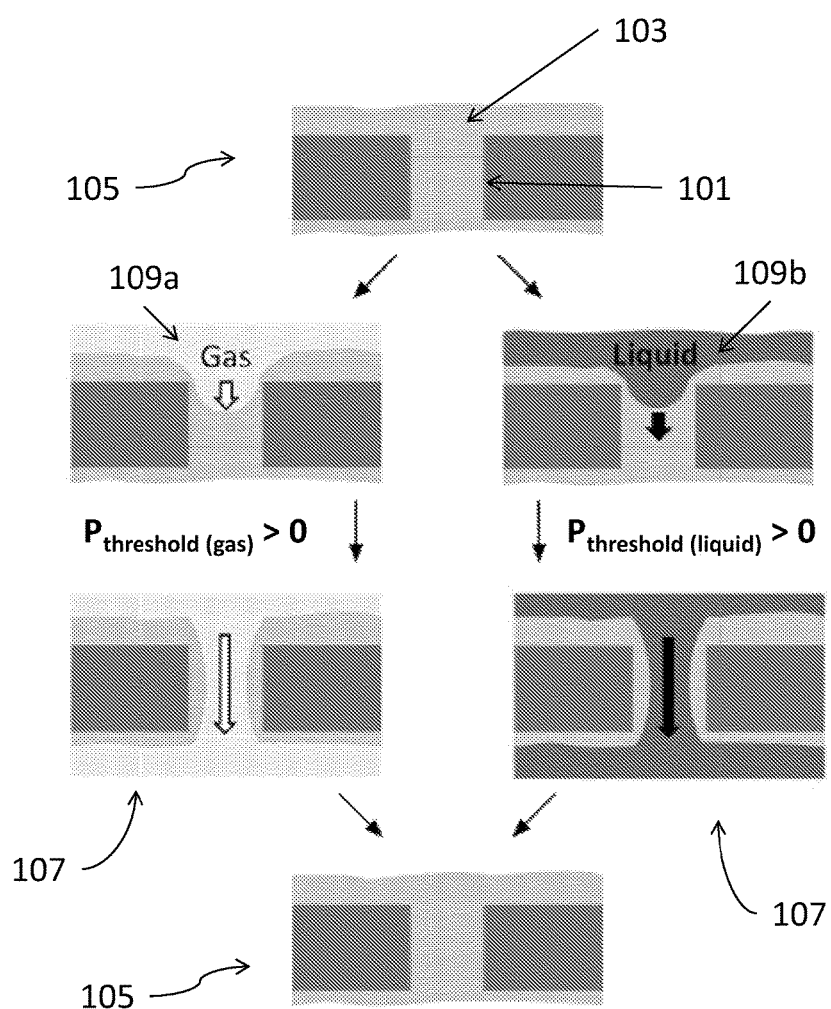
FIGS. 1A and 1B show schematic diagrams of a transport of gases and liquids passing through a pore filled with a wetting liquid in accordance with certain embodiments.

A new, unified gating concept that integrates responsive pore opening/closing with broad multiphase discrimination and antifouling behavior is described. The pore can be filled with a capillary-stabilized fluid that seals the pore in the closed state but reversibly reconfigures under pressure to create a non-fouling, fluid-lined pore in the open state.

In certain embodiments, the gating threshold can be tuned over a wide range to generate differential response profiles for a variety of liquids and gases in one system, even enabling liquids to flow while preventing gas escape. The pores can rapidly and repeatedly open and close, enabling precise, dynamic modulation of gas/liquid sorting in a microfluidic flow and controllable separation of a three-phase air/water/oil mixture, and the system shows non-fouling transport of complex solutions and suspensions such as proteins and blood. Integrating tunable pressure with sustained antifouling behavior enables significant (e.g., >50%) energy savings in long-term operation. The gating strategy can be applied to a variety of pore structures, material chemistries, and nano/micro/macroscale systems, suggesting opportunities for complex sorting in environmental, fuel, biomedical, microfluidics, 3D-printing, and other applications.

The concept of using dynamic reconfiguration of an integral liquid gate to reversibly open and close a wetting liquid-lined pore can provide a tunable, selective gating mechanism that integrates chemical and physical selectivity for the transport substance—in gas and/or liquid phase—with differential, responsive control and non-fouling behavior for complex fluids. At the same time, this approach can provide a solution to the ubiquitous problem of fouling in separation systems or in other systems that require flow (e.g., microfluidic channels or other length scale flows). Coupled with theoretical prediction of gating thresholds and flow rates, this mechanism enables design of a single system that can perform one or more of the following functions:

harvest gas phases with active, tunable control over timing and set point;

dynamically separate multiphase gas/liquid and gas/liquid/liquid and/or liquefied gases in mixtures with control over each component;

preferentially transport liquid while blocking gas flow;

change permeability and reduce the pressure required to transport specific liquids;

prevent fouling by complex inorganic substances and organic substances such as proteins and blood; and attain more than 50% energy savings for long-term fluid transport.

These capacities, combined with longevity, adaptability for a range of materials and geometries and for macro-nano and microfluidic systems, suggest numerous opportunities in areas ranging from fuel harvesting, water treatment, food and beverage and biomedical fluid processing to 3D-printing technology and soft robotics to microscale reactors and microchip sensors.

In certain embodiments, a reconfigurable fluid-filled porous gate enables reconciling the competing demands of responsive control, complex multiphase selectivity, and clogging prevention in a single integrated mechanism.

In certain embodiments, a liquid-filled pore can provide such a unified gating strategy. Without wishing to be bound by theory, a high-affinity liquid stabilized inside a nano- or micropore can offer a unique combination of dynamic and interfacial behaviors.

Structure

Figure 1B:
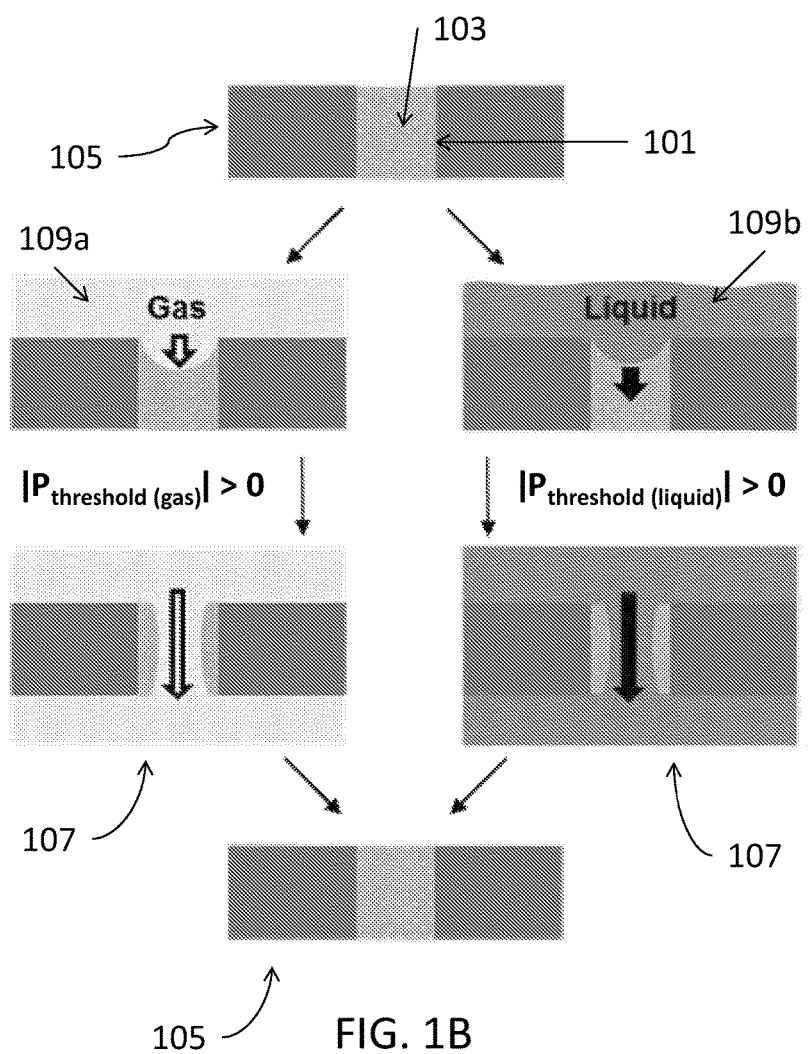

FIGS. 1A and 1B provide simplified schematics of porous gating mechanisms of in accordance with certain embodiments of the invention.

As shown in FIG. 1A, a substrate containing one or more pores 101 (e.g., one pore is shown) is provided with a wetting liquid 103, which can completely seal the pores and form a contiguous coating along the adjacent surfaces to form the closed state 105. In certain instances, the wetting liquid 103 can completely or even partially fill the pore(s) 101.

FIG. 1A shows the instance where the wetting liquid 103 completely fills the pore(s) 101. FIG. 1B shows an instance where the wetting liquid 103 just fills the pore(s) 101.

Figure 30:
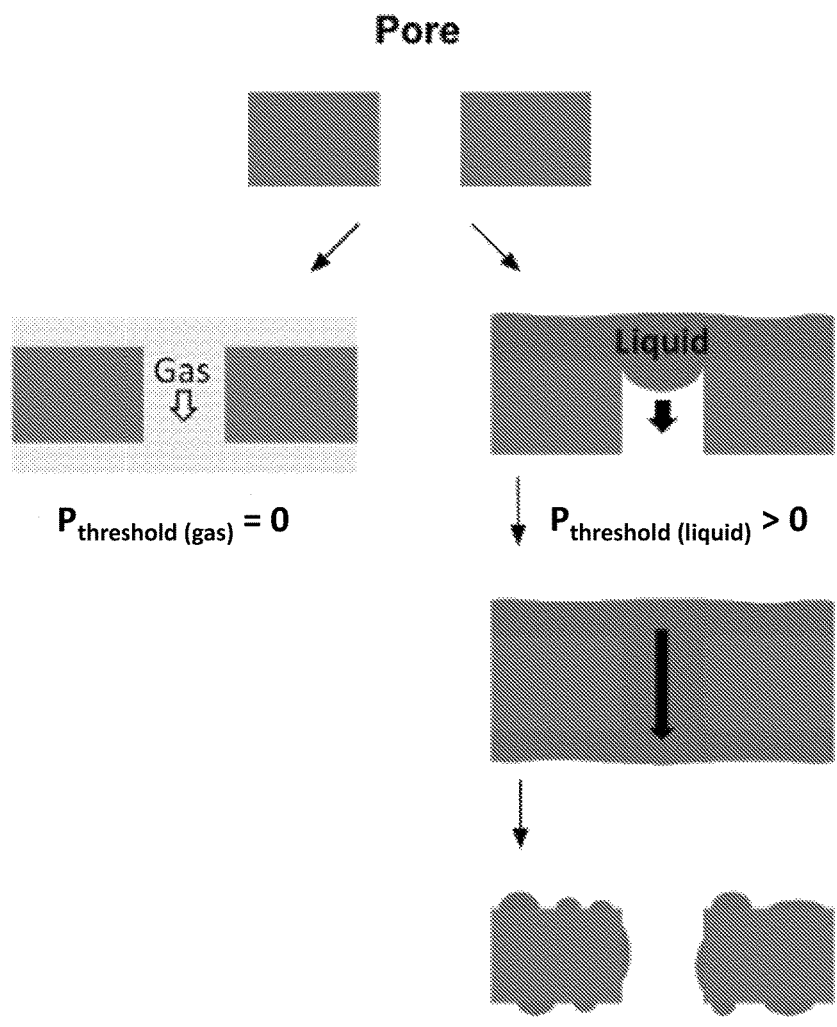
FIG. 30 shows schematic diagrams of a transport of gases and liquids passing through a conventional porous membrane.

In the instances where the pore(s) 101 is filled with a wetting liquid, the transport of a transport fluid 109 (e.g., gas 109a or liquid 109b or suspensions (not shown)) behaves differently from conventional porous system described in FIG. 30. As shown, both gases 109a and liquids 109b must now deform the wetting liquid 103's surface filled in the pore(s) 101 in order to enter and pass through the pore(s) 101. Accordingly, both gases 109a and liquids 109b will require a non-zero pressure to displace the wetting liquid 103.

Figure 1C:
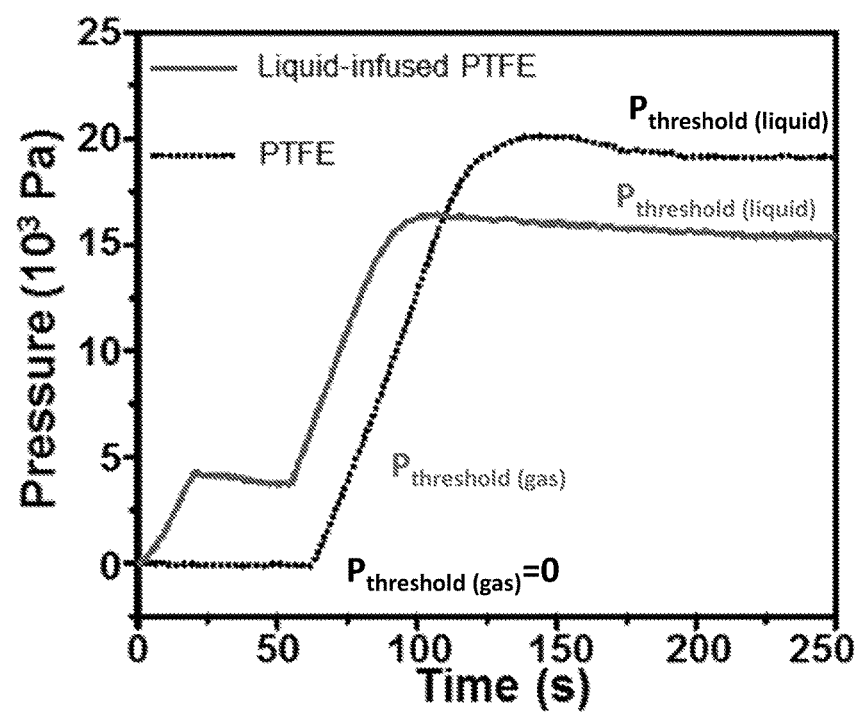
FIG. 1C shows a plot of threshold pressure as a function of time for a conventional porous membrane and wetting liquid-filled porous membrane in accordance with certain embodiments.

Moreover, as shown in FIG. 1C, unlike the conventional porous system (e.g., porous PTFE membrane) in which the transport of a gas through the pores occurs without any applied pressure ($P_{threshold(gas)}$=0), the porous system filled with wetting liquid 103 in accordance with certain embodiments of the invention (e.g., wetting liquid-filled PTFE membrane) may exhibit a non-zero absolute pressure to displace the wetting liquid 103 (i.e., $|P_{threshold(gas)}|>0$).

Furthermore, the pressure needed to displace the wetting liquid 103 may be different for gases 109a and liquids 109b (i.e., $|P_{threshold(gas)}| \neq |P_{threshold(liquid)}|>0$). As shown in FIG. 1C, the threshold pressure to pass through the transport liquid 109b has a finite value for both the conventional porous system (e.g., porous PTFE membrane) as well as the porous system filled with wetting liquid 103 in accordance with certain embodiments of the invention (e.g., wetting liquid-filled PTFE membrane). However, the threshold pressure to displace the wetting liquid 103 is lower for the porous system filled with wetting liquid 103 than the threshold pressure for the transport fluid to pass through the conventional porous system.

In both cases, as long as the wetting liquid 103's affinity for the substrate surface defining the pore(s) 103 is stronger than that of the transport fluid 109, the wetting liquid 103 can be displaced so that an open pathway forms in the open state 107 while remaining adherent to the surfaces of the pore(s) 101 and adjacent surface, creating a continuous fluid-lined pore.

Pore Containing Substrate

Any substrate that contains one or more pores that form one or more contiguous pathways from one side of the substrate to the other side of the substrate can be utilized. For example, plastic, paper, metallic, ceramic, glass, composites, woven fibers and fabrics, and other polymeric membranes containing one or more interconnected pores can be utilized.

In certain embodiments, the substrate can be made from a polymeric material, metallic material, a ceramic material, or combinations thereof. The metallic and ceramic membranes may be more suitable for harsher operational environments. The substrates can be custom fabricated or off the shelf polymeric, ceramic or metallic membranes as well.

Figure 2:
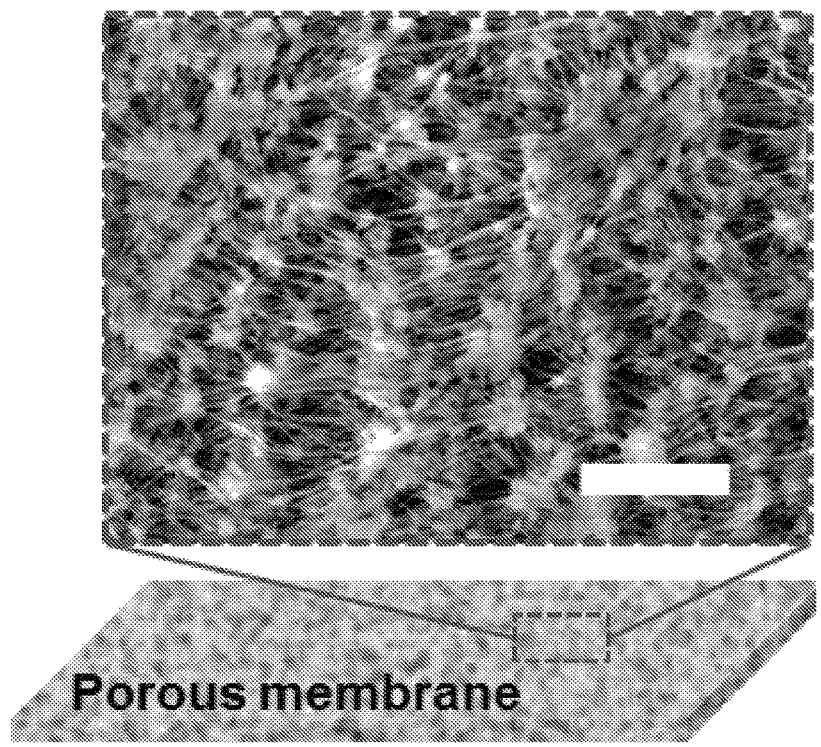
FIG. 2 shows a schematic illustration of a porous membrane that can be utilized in accordance with certain embodiments.

In certain embodiments, the substrate may be a porous membrane, such as a Teflon membrane. Or made of PTFE, PVDF, Nylon, PP, PES, PA, PS, PAN, Alumina, Silicon Carbide, Tungsten Carbide, Titanium Oxide, Zirconia oxide, Carbon, Stainless Steel, Silver, Palladium, vanadium, tantalum, Nickel, Titanium, metal-ceramic, metal alloys or other materials. FIG. 2 shows a scanning electron micrograph of an exemplary porous membrane that can be utilized, where the scale bar is 5 μm.

In certain embodiments, the substrate may be a solid substrate, in which pores have been formed through different techniques (e.g., electrochemical removal, dry or wet etching, physical, chemical or combination of physical and chemical methods, ablation, milling, high energy electron, ion and photon beams, liquid or vapor phase etching, reduction methods, sintering, electrochemical machining and other techniques.

In certain embodiments, the substrate may contain pores that are about in average 10 nm to about 3,000 microns in size or of any combination of sizes in between, such as 20 nm to 2 microns, 100 nm to 10 microns, 100 nm to 1.2 microns, 80 nm to 1 micron, 200 nm to 5 microns, 10 nm to 10 microns, and 100 nm to 50 microns.

In certain embodiments, the substrate surface, including the surfaces defining the pores, can be functionalized with one or more desired methods to promote adhesion and preferential wetting with the wetting liquids. Some suitable functionalization include chemical vapor deposition (CVD), plasma assisted or enhanced CVD, chemical functionalization, solution deposition, silanization of surfaces with hydroxyl groups, plasma treatment for surfaces with native oxides to activate hydroxyl groups followed by vapor or solution based silane deposition.

For some porous surfaces, atomic layer deposition techniques can be used for depositing thin metal or oxide films followed by usage of thiols for functionalization in the case of metal films or the above mentioned functionalization methods for films with oxides.

Wetting Liquid

In certain embodiments, a wetting liquid which has an affinity to the substrate surface can be utilized.

In certain embodiments, a wetting liquid which fills the pores of the substrate can be utilized.

In certain embodiments, the wetting liquid has an affinity with the functionalized groups on the surface of the pores.

In certain embodiments, the wetting liquid has a higher affinity with the substrate surface as compared to the transport fluid such that the wetting liquid remains adhered to the pore surface when the transport fluid is flowing through the wetting liquid-filled pores.

In certain embodiments, the wetting liquid is chosen so that it is immiscible with the transport fluid.

In certain embodiments, wetting liquid can be selected from a number of different fluids. These fluids can be selected based on their biocompatibility, low (or high) toxicity, anti-clotting performance, chemical stability under physiological conditions, and low levels of leaching from the pore surfaces.

Some examples include hydrocarbons, perfluorinated fluids, liquid silicone elastomers and other vegetable and mineral oils.

In certain embodiments, the wetting liquid can be a chemically-inert, high-density biocompatible fluid.

In certain embodiments, the wetting liquid can be a polar or a non-polar liquid.

Gating Mechanism

In certain embodiments, the pressure needed to displace the wetting liquid by the transport fluid (also called "threshold pressure" or "critical pressure") can be systematically tuned based on a common framework.

Figure 3:
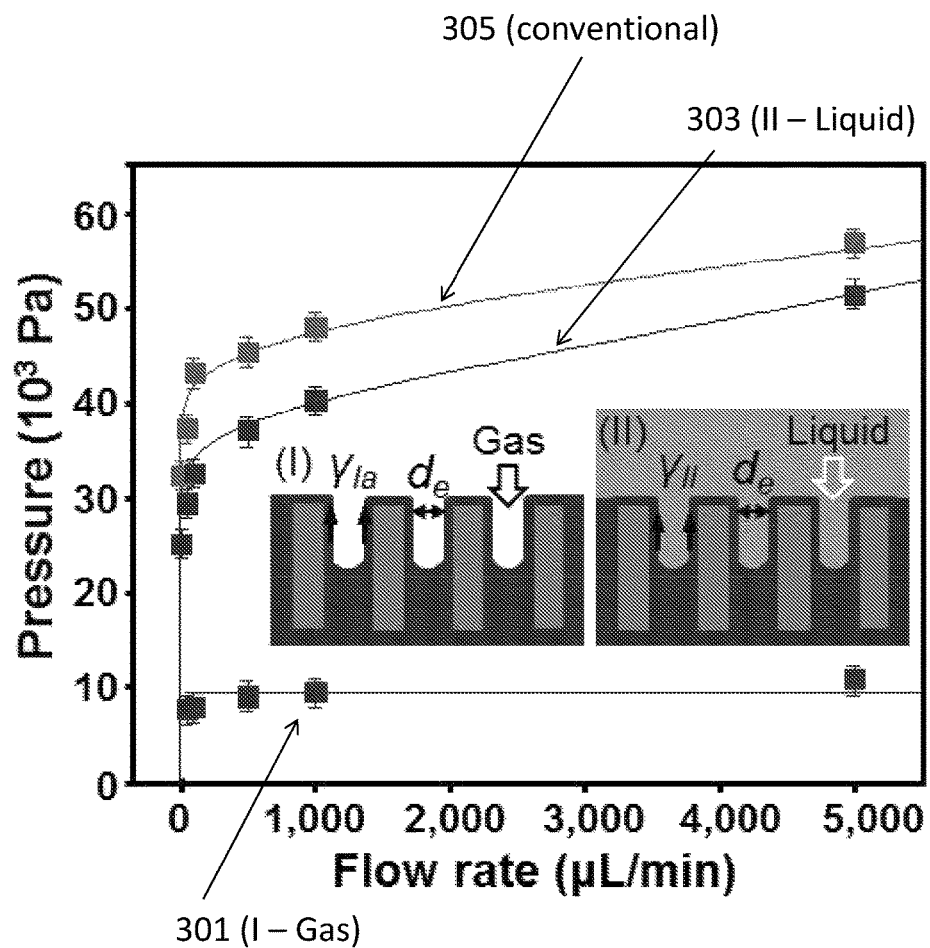
FIG. 3 shows a plot of threshold pressure as a function of flow rate for a conventional porous membrane and wetting liquid-filled porous membrane (experimental and theoretical model) in accordance with certain embodiments.

Without wishing to be bound by theory, gating may occur via similar capillary mechanism for any type of transport fluid, such as gas or liquid or suspensions. FIG. 3 (I) shows a schematic illustration of a plot of pressure v. flow rate for a transport gas displacing the wetting liquid and FIG. 3 (II) shows a schematic illustration of a plot of pressure v. flow rate for a transport liquid displacing the wetting liquid. As shown, the threshold pressure to allow transport gas or liquid to pass through may be the pressure needed to deform the surface of the wetting liquid.

For a gas, the pressure to be overcome may be represented as the Laplace pressure, $4\gamma_{la}/d_e$, where $\gamma_{la}$ is the surface tension of the pore-filling liquid and $d_e$ is the average effective pore size.

The gating pressure for a liquid may also similarly depend on the pore size $d_e$ and on the liquid-liquid interfacial tension $\gamma_{ll}$.

In practice, the pressure for a transport liquid to continue flowing through the pore may also depend on its flow rate Q, and on the viscosity of the transport liquid μ, as $\Delta P \sim Q\mu/k$. Here k is the permeability of the membrane, which is related to the pore structure and size and also depends on the transmembrane pressure or flow rate $$k = \frac{\Phi}{32\tau^2} \int_{\frac{2\gamma_{ll}}{\Delta P}}^{\infty} \frac{X^2}{\sigma\sqrt{2\pi}} e^{-\frac{(X-d)^2}{2\sigma^2}} dX$$

where Φ is the porosity, τ the tortuosity, d the mean pore size, and σ the standard deviation of a porous membrane with distributed pore sizes.

The experimental and theoretical data utilizing the model above match up closely for a wide range of flow rates. For example, as shown in FIG. 3, 301 provides the expected threshold pressure (line) as a function of flow rate based on the model described above along with the actual measured threshold pressure (squares) values for air to pass through a 5 μm porous membrane infused with a low-surface-energy liquid. Similarly, 303 compares the expected threshold pressure (line) as a function of flow rate along with the actual threshold pressure (squares) for water to pass through a 5 μm porous membrane infused with a low-surface-energy liquid.

As shown in 305, the model also works for conventional systems in which water is transported through the pores without any wetting liquid.

Different Variables to Tune Threshold Pressure

In certain embodiments, the threshold pressure can be tuned to a desired value by altering any number of different variables of the gating system described herein. For example, the flow rate of the transport fluid, the substrate material, the pore size, the wetting liquid, interfacial tension of the wetting liquid, viscosity of the transport fluid, pore size distribution and overall membrane permeability, and the like can affect the threshold pressure.

Figure 4A:
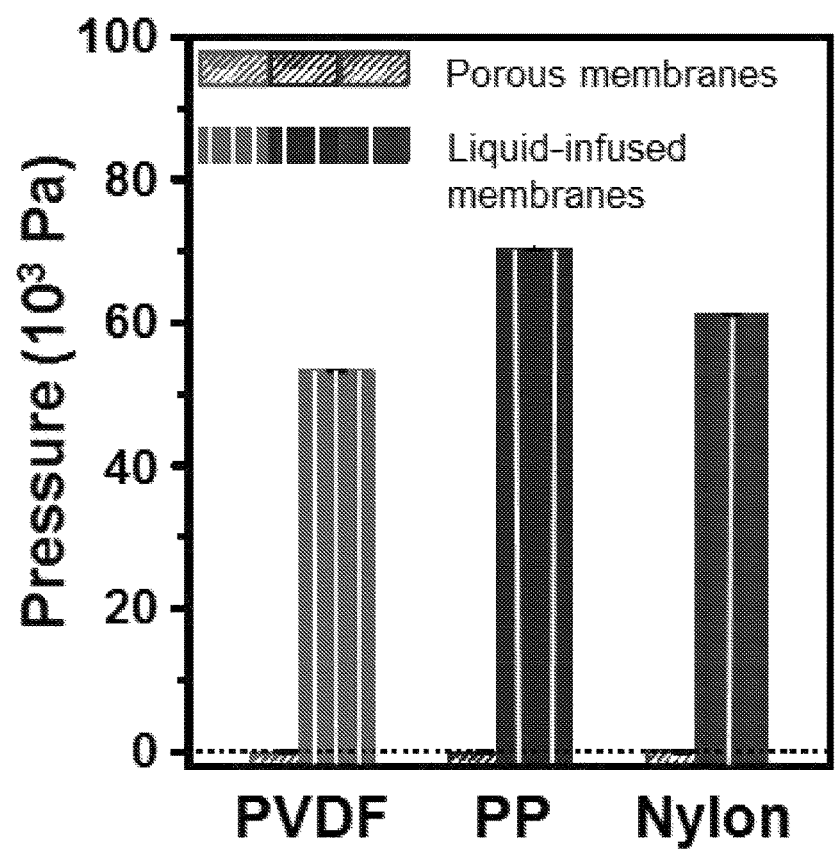
FIG. 4A shows a plot of threshold pressure for different conventional porous membranes and wetting liquid-filled porous membrane in accordance with certain embodiments.

As shown in FIG. 4A, with all other aspects remaining constant, changing the substrate material can alter the threshold pressure. For example, different substrates (e.g., PVDF, PP and Nylon) having an average pore size of about 0.45 μm produce different threshold pressure for a gas to flow through when the substrates are filled with a wetting liquid (labeled "Liquid-infused membranes"). In contrast, the conventional porous systems (labeled "Porous membranes") exhibit a zero threshold pressure and allow passage of transport gas.

Figure 4B:
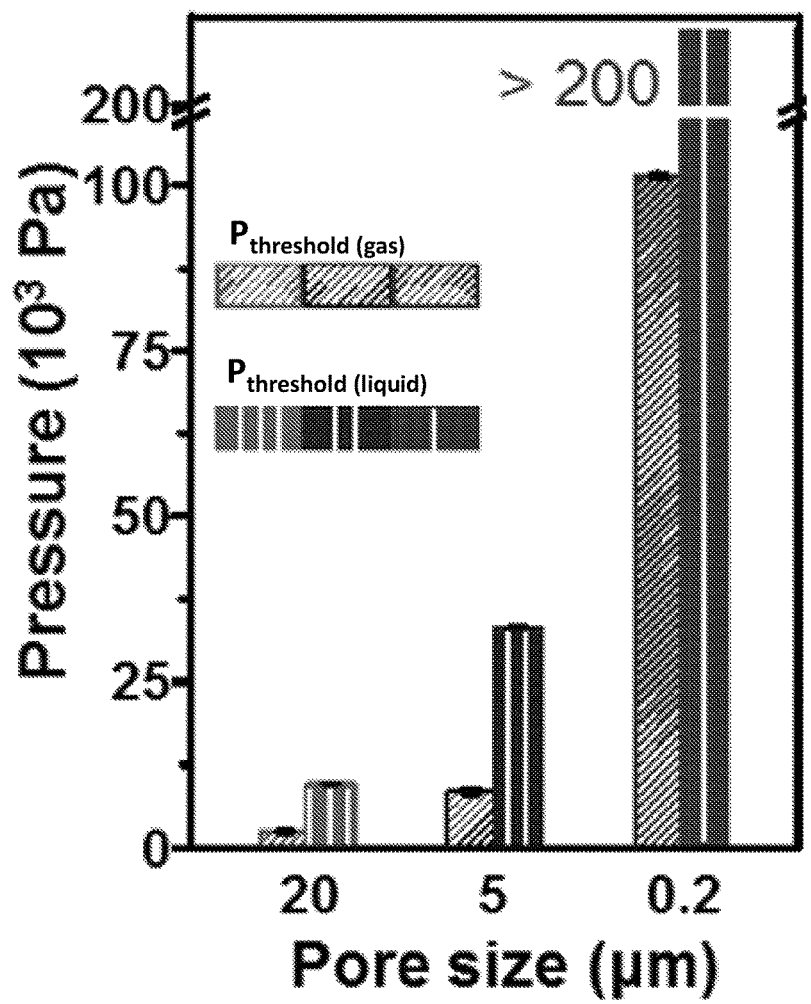
FIG. 4B shows a plot of threshold pressure for different pore sizes of wetting liquid-filled porous membrane in accordance with certain embodiments.

The average pore size can also lead to different threshold pressures. For example, increasing the average pore size can lead to a lower threshold pressure. If a higher threshold pressure is desired, the average pore sizes can be decrease. FIG. 4B shows that for a porous membrane filled with a wetting liquid, the threshold pressure of both the gas (e.g., air) and liquid (e.g., water) can increase with smaller average pore sizes.

Figure 4C:
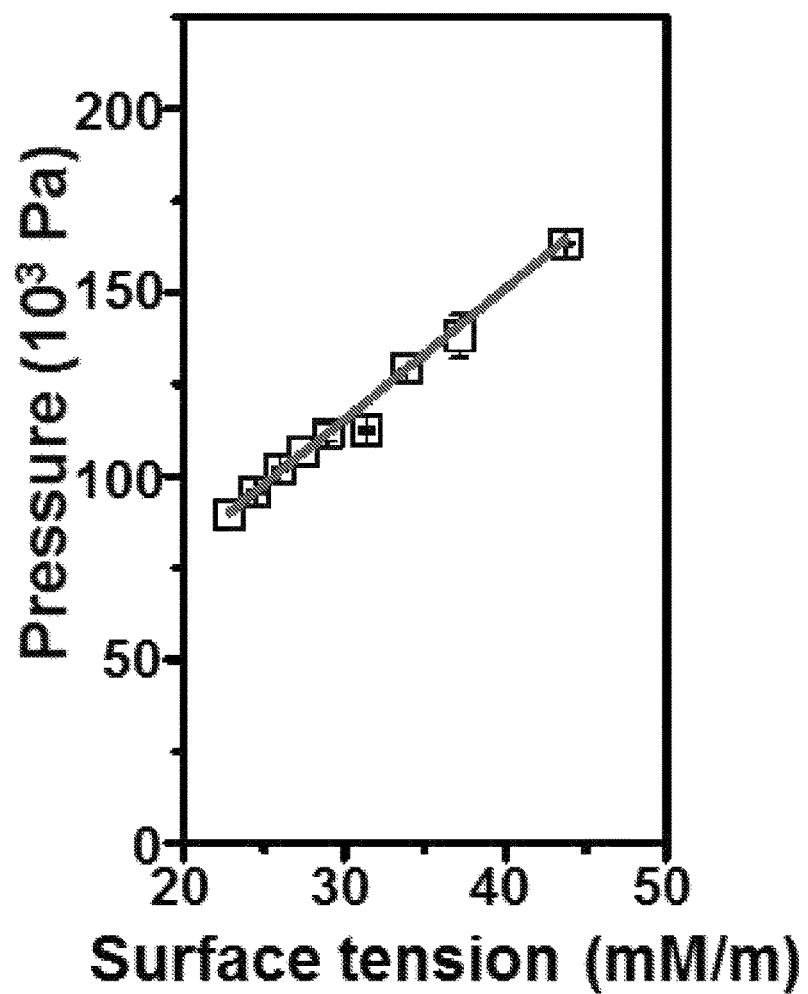
FIG. 4C shows a plot of threshold pressure for different surface tensions of wetting liquid-filled porous membrane in accordance with certain embodiments.

The surface tension of the wetting liquid can also lead to different threshold pressures. For example, with all other aspects remaining constant, selecting a wetting liquid that has a high surface tension can lead to a higher threshold pressure. If a lower threshold pressure is desired, the wetting liquid having a lower surface tension may be utilized. FIG. 4C shows the threshold pressure for transport of a gas (e.g., air) across a nylon porous membrane filled with different mixtures of water and ethanol. Different ratios of water and ethanol provide can provide different surface tension of the wetting liquid. As shown, higher surface tension of the wetting liquid can lead to higher threshold pressure.

Figure 4D:
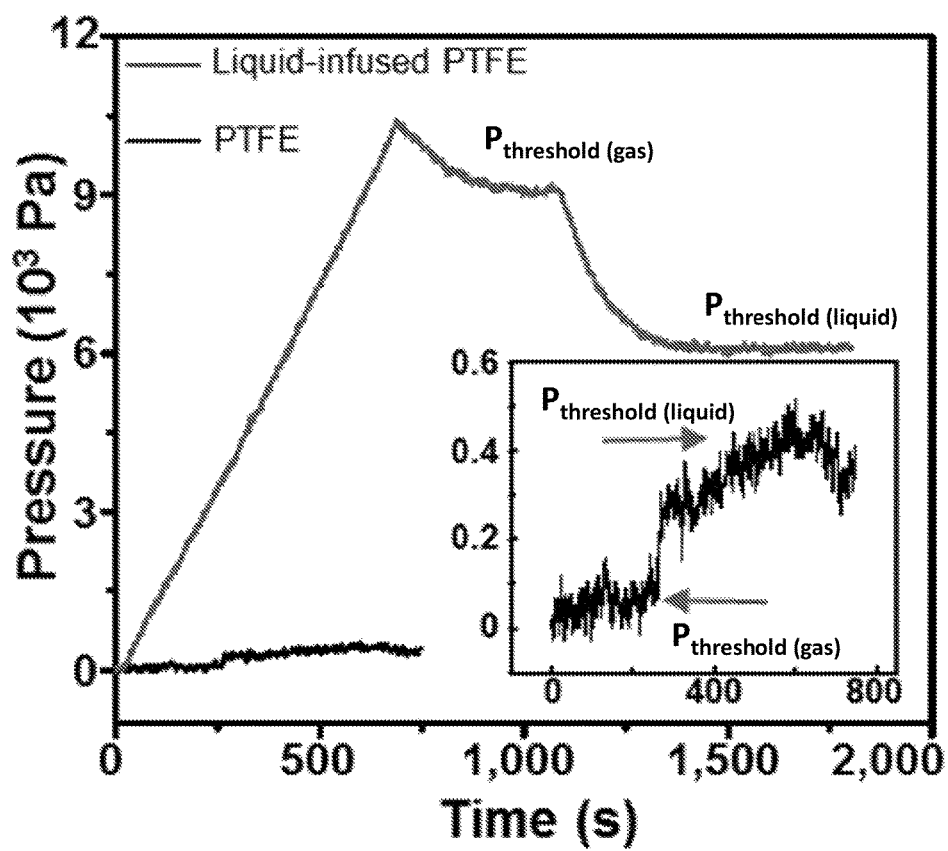
FIG. 4D shows a plot of threshold pressures for different transport fluids passing through conventional porous membranes and wetting liquid-filled porous membrane in accordance with certain embodiments.
Figure 5A:
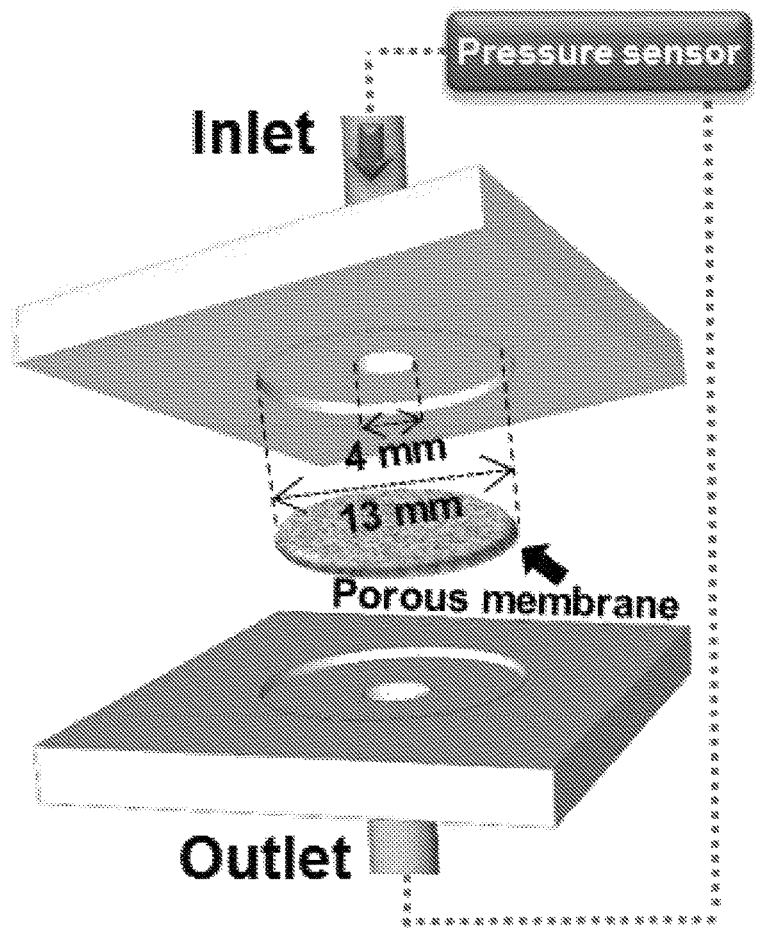
FIGS. 5A and 5B show schematic diagrams of gating systems in an in-line or dead-end and cross-flow configuration utilizing wetting liquid-filled porous membrane in accordance with certain embodiments.

In certain embodiments, the threshold pressure for transport gas can be made even higher than that for the transport liquid. This is in stark contrast to conventional porous systems in which gas passes through the membrane with little or no pressure whereas liquids require higher pressures to pass through the conventional porous membrane. For example, since the interfacial tension is higher for air than for ethanol, pressures can be selected where ethanol flows through the pore while air does not, meaning permeability is lower for air as compared to permeability of ethanol in this embodiment. FIG. 4D shows the threshold pressures for air (bottom curve) and ethanol (top curve) through liquid-gated pores. The difference in interfacial tensions leads to a unique situation when threshold pressure for liquid (ethanol) is lower than for gas (air). As shown in the inset of FIG. 4D, without the wetting liquid, the threshold pressures for both air and ethanol are negligible Gating Systems In certain embodiments, as shown in FIG. 5A, the porous substrate filled with a wetting liquid may be provided between an inlet and an outlet. For example, a porous membrane having a diameter of about 13 mm (although any sizes can be utilized) and average pore size of 10 nm up to an average pore size of 100 microns, or 5 microns to 20 microns (although any sizes can be utilized) can be provided between two plates, which has an inlet and an outlet to allow flow of the transport fluid 109 across the porous membrane. A pressure sensor may be provided across the inlet and the outlet to measure the amount of pressure that can determine whether the wetting liquid-filled pores are in the closed state 105 or the open state 107, as discussed previously with respect to FIGS. 1A and 1B. If a pressure applied across the porous membrane is below the threshold pressure for the transport fluid 109 to pass through the wetting liquid-filled pores, the pores will remain in the closed state 105. If the pressure applied at the inlet is above the threshold pressure for the transport fluid 109 to pass through the wetting liquid-filled pores, the pores will then open up to the open state 107 and allow passage of the transport fluid through the membrane and into the outlet.

Moreover, since gating of the transport fluid 109 is based on structural reconfiguration of the wetting liquid 103 rather than removal or purging of the wetting liquid 103 from the pores 101, the pore 101 may stay open when the transport fluid 109 is flowing and the pore 101 can close to form the closed state 105 with the wetting liquid 103 as soon as the pressure drops below the threshold pressure required to pass the transport fluid 109. Since the wetting liquid 103 has a higher affinity to the pore material compared to the transport fluid 109, when the pressure rises above the threshold pressure, the wetting liquid 103 can be distributed from inside the pore to adjacent surfaces along the pore while maintaining a thin over layer of the wetting liquid inside the open pore. The pore wetting liquid 103 can be thermodynamically primed to reconfigure and close the pore as soon as the pressure drops below the threshold pressure.

Since this rationale is not specific to particular solid or fluid properties, the approach can be used to design gated transport systems starting from a wide variety of pore sizes, geometries, and surface chemistries as well as gating liquids.

Figure 5B:
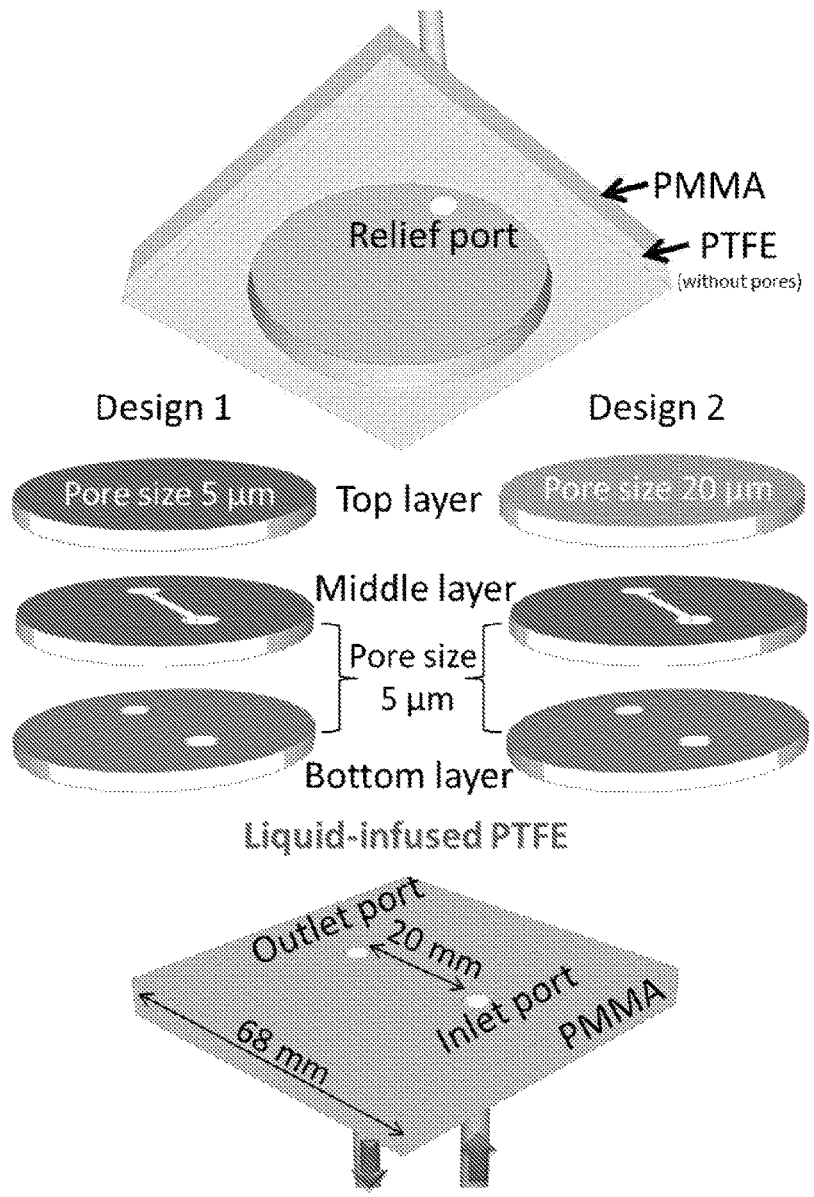

In certain embodiments, the gating system can be employed in a fluidic channel (e.g., nanofluidic or microfluidic channel or a macrofluidic channel) in which multiple ports are present. For example, as shown in FIG. 5B, a microfluidic channel can be formed by stacking different membranes. In "Design 1," shown on the left, the "middle layer" has a microfluidic channel defined in a membrane having an average pore size of about 5 µm. The microfluidic channel is then sandwiched between an upper porous membrane and a lower porous membrane having holes that align with the ends of the channel, each of which have the same average pore size of about 5 µm. Then, the top, middle and bottom porous membranes can be wetted with a wetting liquid. An inlet port and outlet port on a lower plate at the bottom of the gating system then connects to holes of the lower porous membrane of the microfluidic channel and the transport fluid can flow between the inlet and the outlet of the gating system. As the pressure increases and surpasses the threshold pressure (e.g., by increasing the flow rate), the transport fluid can then pass through the top layer porous membrane and exit out a relief port located in an upper plate of the gating system. "Design 2" is nearly identical to "Design 1," except that the top layer can contain a porous membrane with a larger average pore size (e.g., 20 µm) which can allow the threshold pressure to be lower (e.g., reach threshold pressure at lower flow rates).

Separation of Multiphase Mixtures

In certain embodiments, the transport fluid can include a combination of gases, liquids, suspensions and mixtures thereof. For example, a transport fluid may contain multiple liquids, multiple gases, multiple suspensions or even a mixture of gases, liquefied gases, liquids and/or suspensions. In such mixed transport fluids, different threshold pressures allow transport of one particular component (e.g., first liquid vs. second liquid or gas vs. liquid) to provide efficient separation of one or more particular components within the transport fluid. For example, the gating system shown in FIG. 5B can be utilized to separate multiphase mixtures of the transport fluid into its respective components, as is described in greater detail with reference to FIGS. 6A-6D.

Figure 6A:
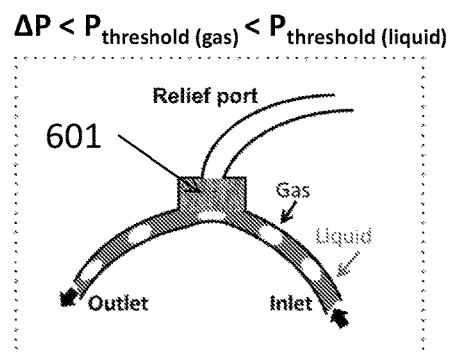
Figure 6B:
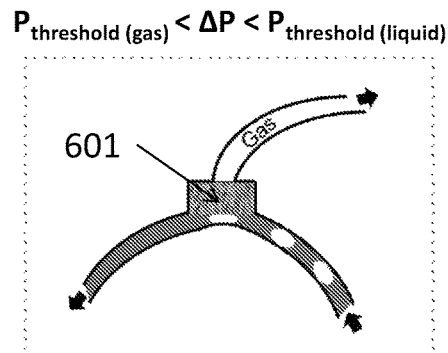
Figure 6C:
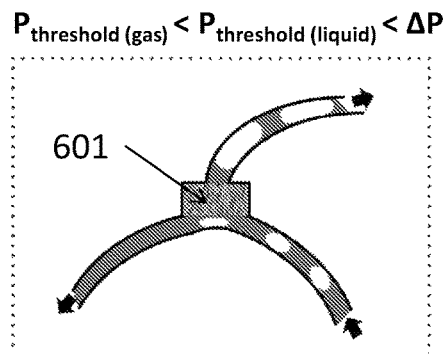
Figure 6D:
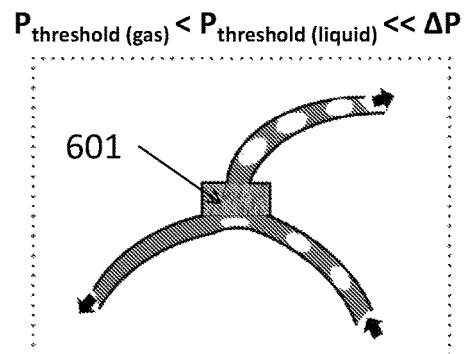

FIGS. 6A-6D show the schematic illustrations in which a transport fluid containing multiple phases (i.e., both gas and liquid) can be separated into its respective components. Element 601 corresponds to the device shown in exploded view in FIG. 5B. As shown in FIG. 6A, at pressures below both $P_{threshold(gas)}$ and $P_{threshold(liquid)}$, the transport fluid containing gas and liquid flows from the inlet, throughout the microfluidic channel (described in greater detail in FIG. 5B) and out to the outlet port. As shown, the transport fluid does not flow through the relief port. Then, as shown in FIG. 6B, above $P_{threshold(gas)}$ and below $P_{threshold(liquid)}$, only the gas contained in the transport fluid flows through the wetting-liquid filled membrane and gas is separated out to the relief port. In contrast, only the liquid flows through the microfluidic channel and out to the outlet port. Then, as shown in FIGS. 6C and 6D, as the pressure increases even further above both $P_{threshold(gas)}$ and $P_{threshold(liquid)}$, the liquid contained in the transport fluid also begins to flow through the wetting-liquid filled membrane and into the relief port. Increasing the pressure even further leads to greater amount of the gas and liquid passing through the wetting-liquid filled membrane and into the relief port.

Figure 7A:
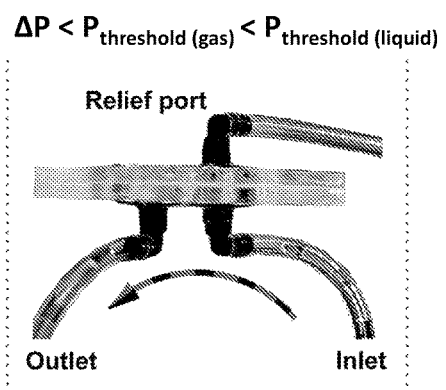
Figure 7B:
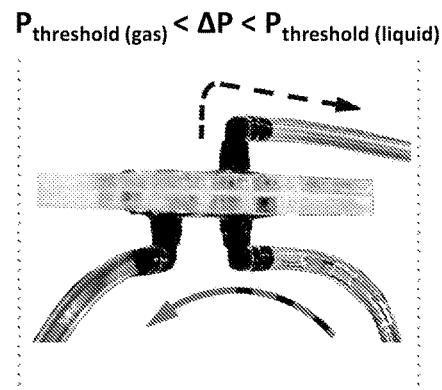
Figure 7C:
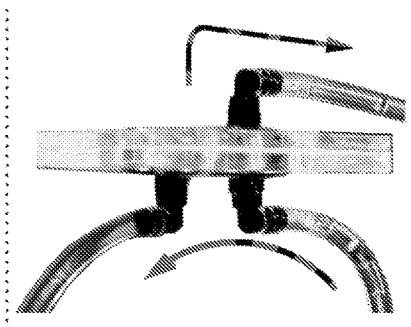
Figure 7D:
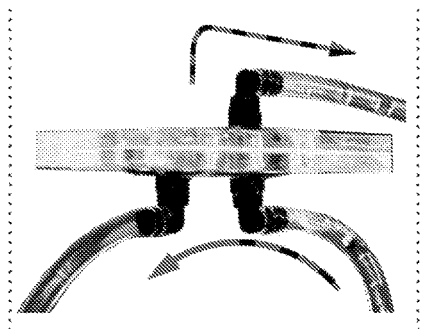

FIGS. 7A to 7D show the experimental devices made in accordance with FIGS. 6A to 6D, where $P_{threshold(gas)}$=2.3 kPa and $P_{threshold(liquid)}$>=9.8 kPa. For example, as shown in FIG. 7A, if the pressure is below 2.3 kPa, neither air nor water can flow through the wetting liquid filled porous membrane. Then, as shown in FIG. 7B, between the two threshold pressures of 2.3 kPa and 9.8 kPa, only air flows through the wetting liquid filled porous membrane, and only water continues to the outlet port. Above 9.8 kPa, as shown in FIGS. 7C and 7D, both air and water cross the wetting liquid filled porous membrane. Moreover, the precise liquid/gas balance can be modulated by graded pressure changes, since pressure increases the flow rate through the wetting liquid filled porous membrane significantly for liquids but only negligibly for gases. The robust behavior indicates that the pores can sustain many cycles of very rapid opening and closure while remaining faithful to the two originally programmed gating pressures, and the system can operate continuously for at least several days.

In certain embodiments, the mixed transport fluid can contain an even greater number of components to be separated out. For example, FIGS. 8A and 8B show a three-phase mixture of air, water and crude oil. As shown, the gating system can be prepared such that the threshold pressure for oil is the highest, followed by water, and then followed by gas. In the current embodiments, pressure is applied using a cylindrical plunger positioned above a wetting liquid-filled porous membrane. As shown in FIG. 8A, if the plunger is maintained so that the pressure is below the threshold pressures for gas, water and oil, the transport fluid does not pass through the wetting liquid-filled porous membrane. However, as shown in FIG. 8B, if the pressure (P) is increased above the threshold pressure for gas ($P_{gas}$), air passes through the wetting liquid-filled porous membrane, allowing air to be separated from the three-component mixture. As shown in FIG. 8C, if the pressure (P) is increased above the threshold pressure for water ($P_{water}$) but below the threshold pressure for oil ($P_{oil}$), both water and air can pass through separating the oil from the air and water. Accordingly, even in a three-phase mixture of air, water and crude oil can be progressively separated by the wetting liquid-filled porous membrane, with each substance collected under a distinct pressure. When set to a distinct threshold pressures for each component of an air/water/crude oil mixture, the wetting liquid-filled porous membrane allows for active control and individual collection of each component at successive pressures, as well as controlled conditions where no components can escape.

Anti-Fouling

In certain embodiments, the wetting liquid 103 may be selected that so that it is immiscible with the transport fluid 109. Accordingly, unlike in the conventional porous systems, the contact of the transport fluid 109 to the substrate surfaces can be reduced, minimized or even eliminated as the transport fluid 109 may be in physical contact with the wetting liquid 103 as it passes through the pores. As a result, fouling caused by adhesion of the transport fluid 109 onto the pore walls and/or the substrate surfaces may be reduced, minimized or eliminated.

For example, as shown in the embodiment of FIG. 1A, the transport fluid 109 may contact only the wetting liquid 103 in both the open state 107 and closed state 105, reducing, minimizing, or even preventing fouling in, on and around the pore(s) 101.

As such, the flow of the transport fluid 109 may be gated by controlling the pressure. In the open state 107, the wetting liquid 103 can rearrange itself to form a wetting liquid-lined pore 101. Each transport fluid 109 may also have a specific threshold pressure based on its ability to overcome the capillary pressure at the liquid-gas or liquid-liquid interface. Moreover, the wetting liquid-lined pore 101 may prevent contact of the transport fluid 109 with the pore walls. When the pressure is released, a non-fouled pore returns to its original wetting liquid-filled closed state 105. The wetting liquid-based gating mechanism provides a unified strategy for selective, responsive, tunable, and antifouling multiphase transport.

Figure 9:
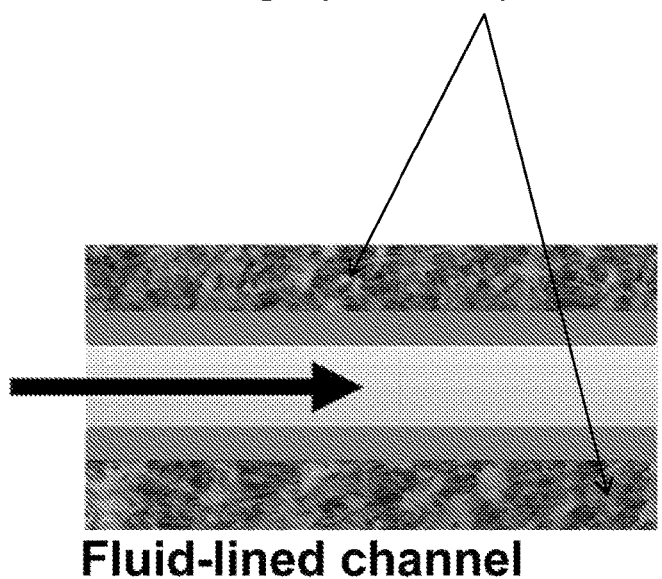
FIG. 9 shows a microfluidic channel formed around a wetting liquid-filled porous membrane in accordance with certain embodiments.

The idea of using a fluid lining to prevent fouling inside a nano- or micropore can be extended to the interior of microfluidic channels. As shown in FIG. 9, microfluidic channel can be formed with a wetting liquid-filled porous membrane. Combined with the antifouling/nontrapping properties of both the interior and the outer surface of the liquid-gated pores, designing comprehensive microfluidic systems that resist fouling and enable tunable gated flow of complex multiphase substances becomes possible.

Figure 10A:
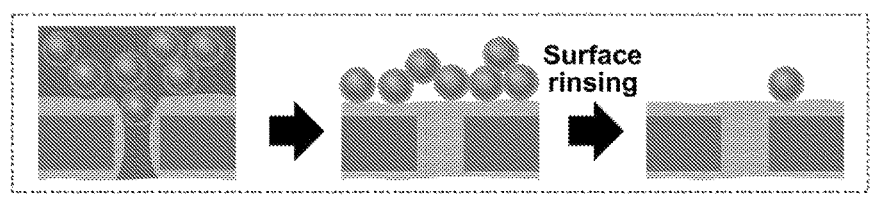
FIGS. 10A and 10B shows schematic illustrations of a suspension passing over and through a conventional porous membrane and a wetting liquid-filled porous membrane in accordance with certain embodiments, respectively.
Figure 10B:
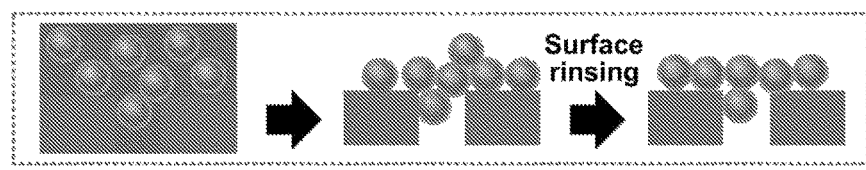

This non-fouling behavior is especially beneficial for transport fluids that contain suspensions. For suspensions containing particles larger than the pore diameter, the combination of a wetting liquid-filled pore and a contiguous wetting liquid-lined outer surface enables non-fouling separation behavior. As shown in FIG. 10A, after flowing a suspension of solid particles, the particles can be suspended on top of the closed pores and can be easily collected by a gentle surface rinse. In contrast, as shown in FIG. 10B, the conventional porous membrane can trap the particles both in and around the pores and can resist repeated rinsing. By integrating antifouling behavior and tunable pressure in one system, the gating mechanism can not only provide the flexibility to have a lower working pressure than conventional membranes but also prevents the working pressure from building up over time, a problem that commonly occurs in conventional membranes due to uncontrolled fouling.

APPLICATIONS

The wetting liquid-filled porous membranes described herein can be utilized in a large number of applications. Some suitable applications include microfiltration, ultrafiltration and particle filtration. For example, filtration involving water treatment, pharmaceuticals, biological, bioprocessing, food, beverage (e.g., wine, beer), electronics processing and other industrial and chemical processing applications including adding or removing dissolved gasses or liquefied gases can benefit from such wetting liquid-filled porous membranes.

EXAMPLES

Materials Utilized

The wetting liquid used for the experiments were Krytox®100, 103 and 106, except where otherwise specified.

Deionized (DI) water with a resistivity of 18.3 MΩ·cm was used for the measurements.

The transport fluids were obtained from Sigma Aldrich.

Pure ethanol (200 Proof ethanol part number V1001, CAS #64-17-5) was used for the organic solvent experiments.

Rhodamine B aqueous solution (HPLC, ≥97.0%) used in the microfluidic experiments was prepared by dissolving in DI water to give a final concentration of 0.1 mg/mL.

Microparticles used for fouling experiments were surfactant-free fluorescent yellow green sulfate latex with diameter ~1.6 μm (Solid %: 1.9), obtained from Invitrogen. A 1.9% suspension was diluted in 2 mL H2O, yielding an approximately 0.10 Vol % suspension that was used for experiments.

Fluorescein-conjugated bovine serum albumin (BSA) was obtained from Molecular Probes® in Fraction V, BSA from J.T. Baker®.

Phosphate buffered saline (PBS) was obtained from Biowhittaker®.

Fluorescently labeled protein solution: 1% fluorescein-conjugated BSA was diluted in 1×PBS to a final total protein concentration of 1%. Sheep blood in heparin (3 IU/mL) was obtained from HemoStat Laboratories, CA, USA.

VWR Vacuum pump oil 19 utilizes crude oil stocks that were obtained from VWR.com (VWR North American Cat. No 54996-061), and is referred to as crude oil.

Membrane Preparation

Wetting liquid-filled pores were generated by infusing a variety of commercial porous membranes with low-surface-energy liquids (Krytox®100, 103 and 106 from Miller-Stephenson Chemical Co., U.S.A.). Nylon membranes (pore size 0.45 μm) were purchased from Sterlitech Corporation, WA, U.S.A. Poly(vinylidene fluoride) porous membranes: PVDF membranes (pore size 0.45 μm) were purchased from EMD Millipore Corporation, Billerica, Mass., U.S.A. Polypropylene porous membranes: PP membranes (pore size 0.45 μm) were purchased from Sterlitech Corporation, WA, U.S.A. PTFE porous membranes: Three types of PTFE membranes were purchased from Sterlitech Corporation, WA, U.S.A. 1) average pore size of ~20 μm and thickness of ~200 μm, 2) average pore size of ~5 μm and thickness of ~200 μm, and 3) average pore size of ~0.2 μm and thickness of ~30 μm.

Figures 11A, 11B, 11C, 11D, 11E, 11F:
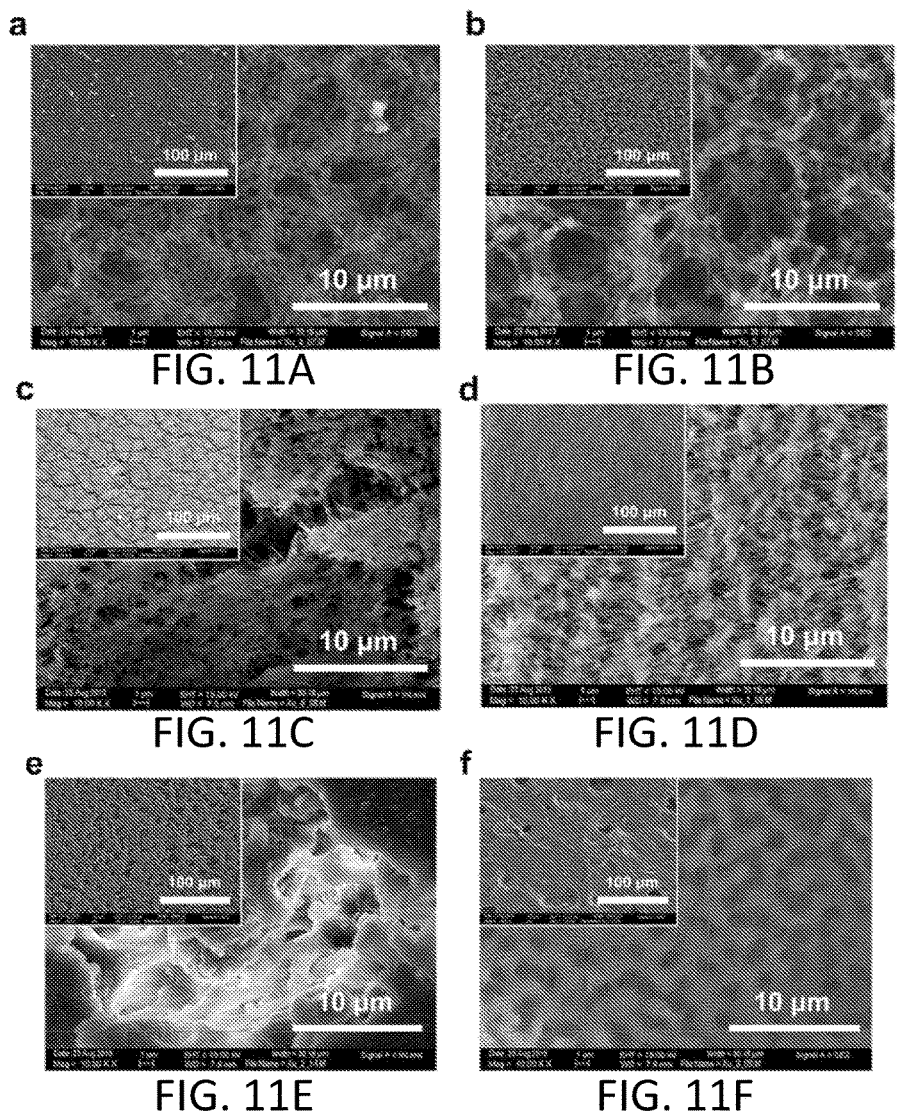
FIGS. 11A-11F show Scanning Electron Microscope (SEM) images of different porous membrane that can be utilized in accordance with certain embodiments.

These membranes were evaluated by scanning electron microscope. FIG. 11A shows the nylon porous membranes (pore size 0.45 μm, large area image at top left). FIG. 11B shows the poly(vinylidene fluoride) porous membranes (pore size 0.45 μm, large area image at top left). FIG. 11C shows the polypropylene porous membranes (pore size 0.45

µm, large area image at top left). FIG. 11D shows the PTFE porous membranes (pore size 0.2 µm, large area image at top left). FIG. 11E shows the PTFE porous membranes (pore size 5 µm, large area image at top left). FIG. 11F shows the PTFE porous membranes (pore size 20 µm, large area image at top left).

These membranes were also evaluated by contact angle measurements (see Tables S1-S3). The contact angle (Table S1) was measured by a commercial contact angle measurement system (Kruss goniometer DSA100) at room temperature (~20° C.) with ~20% relative humidity.

TABLE S1

Measured contact angle of porous membranes.

| Materials | Contact angle | | Liquid H$_2$O (5 µL) |
|---|---|---|---|
| Polypropylene | $\theta_{static}$ | | 141.0 ± 3.4° |
| Polypropylene with Krytox ® 100 | $\theta_{static}$ | | 120.9 ± 1.7° |
| Poly(vinylidene fluoride) | $\theta_{static}$ | | 134.8 ± 1.0° |
| PTFE (pore size 20 µm) | $\theta_{static}$ | | 143.5 ± 2.6° |

Prior to infusion with the wetting liquid, the threshold pressure of water through each membrane was measured to roughly estimate the pore size, and those membranes with pore sizes that deviated from the range reported by the supplier were excluded.

Transmembrane Pressure Measurement

The transmembrane properties of hydrophilic and hydrophobic porous membranes without and with infused liquids were determined by measuring the transmembrane pressure (ΔP) during flow of DI water. ΔP was measured by wet/wet current output differential pressure transmitter (PX273-030DI) from Omega.com, Stamford, Conn., USA. A porous membrane of 13 mm diameter was mounted between two chambers as shown in FIG. 5A.

Fluorescence Measurement

Zeiss Confocal Laser Scanning Microscope from Carl Zeiss Microscopy GmbH, Jena, Germany, (LSM 700) was used in the fluorescent and confocal experiments.

Choice of Gating Liquid

Figure 12:
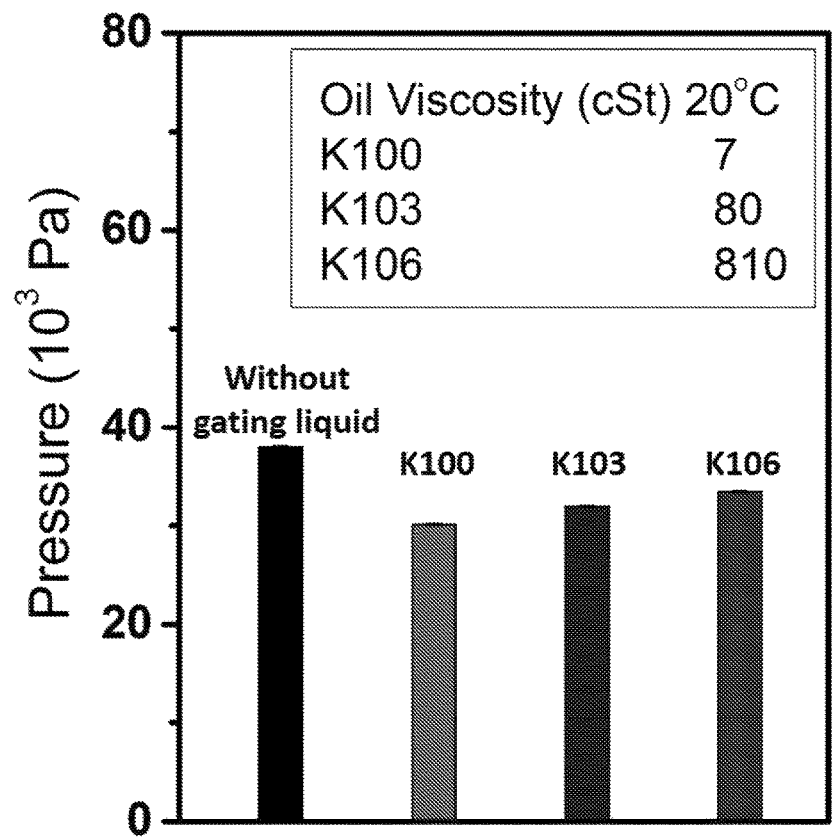
FIG. 12 shows a plot of threshold pressures for conventional porous membrane and wetting liquid-filled porous membranes that utilize different wetting liquids in accordance with certain embodiments.

Krytox oils were used as the gating liquid for demonstrating the concept except where otherwise specified, and include Krytox® 100, Krytox® 103, and Krytox® 106. As shown in Table S2, the surface tensions of the three liquids are nearly the same but order-of-magnitude differences in viscosity were observed. Surface tension was measured with the Kruss goniometer measurement system through the pendant drop method. As shown in FIG. 12, as predicted by the model, similar gas and liquid transport behavior were observed, despite order-of-magnitude differences in viscosity. Therefore the three oils could be used interchangeably for most experiments. In cases where the system was used in an open environment, Krytox® 106 was chosen for its low volatility (Table S2).

TABLE S2

Liquid Properties.

| Liquid | Surface tension (mN/m) | | Viscosity (cSt, at 20° C.) | Volatility (lost after 22 hr at 66° C.) |
| | Mean | SD | | |
|---|---|---|---|---|
| DI-Water | 72.05 | 1.20 | 1 | — |
| Krytox ® 100 | 15.53 | 0.08 | 7 | 11% |
| Krytox ® 103 | 17.65 | 0.33 | 80 | 1% |
| Krytox ® 106 | 19.8 | 0.26 | 810 | <1% |

TABLE S3

Measured interfacial tension between water and the pore-filling wetting liquids.

| | Surface tension (mN/m) | |
| Liquid | Mean | SD |
|---|---|---|
| DI-Water/Krytox ® 100 | 53.09 | 0.04 |
| DI-Water/Krytox ® 103 | 53.66 | 0.56 |
| DI-Water/Krytox ® 106 | 52.11 | 0.09 |

Theoretical Modeling of Liquid and Gas Transport Through a Porous Membrane Infused with a Gating Liquid For a gas to flow through a wetting liquid-filled porous membrane with average pore size d, the capillary pressure across the liquid-gas interface has to be conquered, $4\gamma_{la}/d$, with $\gamma_{la}$ being the gas-liquid surface tension. For a PTFE membrane with 5 µm pores infused with Krytox®100, the capillary pressure is approximately 12.4 kPa, which is consistent with the experimental results shown in FIG. 3.

For liquid flowing through a porous membrane, the transmembrane pressure ΔP is related to the flow rate Q by the empirical Darcy's law $$Q = \frac{kA\Delta P}{\mu h}$$

where A and h are the area and thickness of the porous membrane, µ the viscosity of the liquid, and k the permeability of the porous media which has a unit of length squared. To interpret k, we need a microscopic model. Here we adapt a simple model assuming the pores are in the configuration of cylindrical tubes (reference 30 in main text). For water to flow through a hydrophobic tube, a minimum pressure is required due to the capillary effect. The minimum pressure depends on the pore size and interfacial tension. Here we assume the pore size of a commercial PTFE membrane follows a normal distribution with d being the mean pore size and σ the standard deviation. Under a transmembrane pressure ΔP, only those pores of diameter larger than 2γ/ΔP are considered penetrated pores. Smaller pores remain closed. Consequently, the permeability is related to the transmembrane pressure as, $$k = \frac{\Phi}{32\tau^2} \int_{\frac{2\gamma}{\Delta P}}^{\infty} \frac{X^2}{\sigma\sqrt{2\pi}} e^{-\frac{(X-d)^2}{2\sigma^2}} dX$$

where Φ is the porosity, τ the tortuosity, and γ is the liquid-air surface tension of the transport liquid in the case of a pure PTFE porous membrane and the liquid-liquid interfacial tension in the case of transport through a wetting liquid-filled PTFE membrane. The values of the surface tension of several pore-filling liquids and their interfacial tension with water have been measured and listed in Table S2-S3.

First, the material parameters $\Phi/\tau^2=0.056$ and $\sigma=0.4$ µm were obtained by fitting the theoretical curve with the experimental data of water transporting through a 5 µm pore size PTFE membrane, as shown in 305 in FIG. 3. Then, the curve for water transporting through a PTFE membrane infused with a Krytox®100 was predicted, which fit well with the experimental data, as shown in 303 in FIG. 3.

Figure 13A:
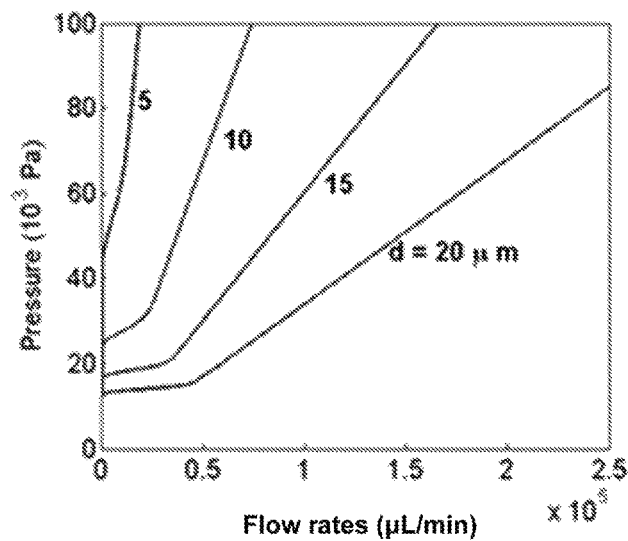
FIGS. 13A-13C show plots of threshold pressures as a function of different flow rates for different wetting liquid-filled porous membranes in accordance with certain embodiments.
Figure 13B:
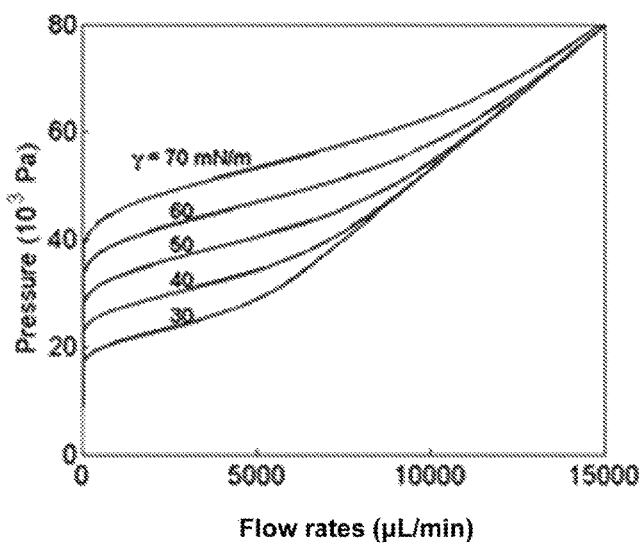
Figure 13C:
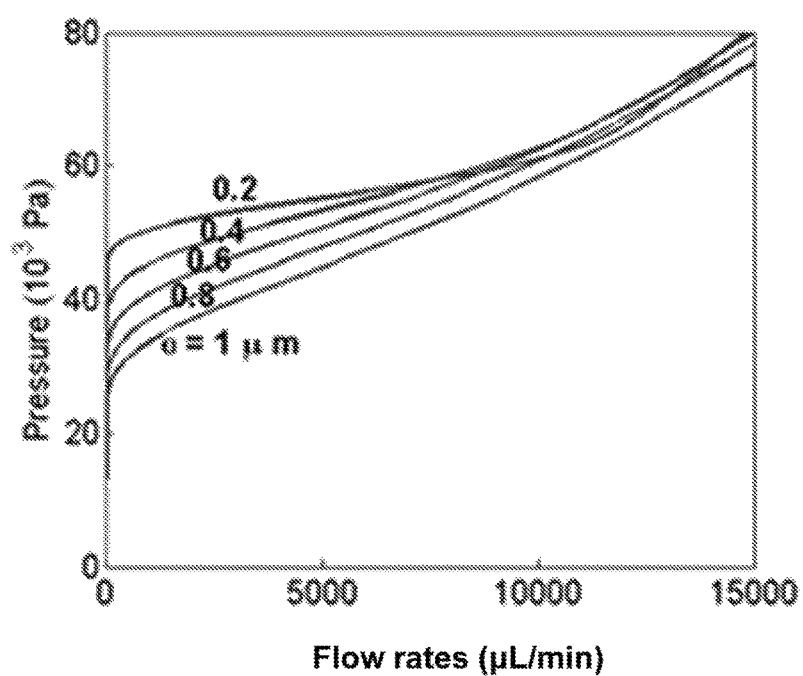

With this model, the tunability of the system can be quantitatively studied. The performance of the system strongly depends on the pore size, the interfacial tension, and the pore size distribution. As shown in FIG. 13A, for a smaller pore size, a higher transmembrane pressure is required to maintain a certain rate of flow. As shown in FIG. 13B, for a higher interfacial tension, a higher pressure is required. When the pressure is high enough that all the pores are penetrated, the flow rate and transmembrane pressure show a linear dependence. For a membrane with widely distributed pore sizes, as the pressure increases, more and more pores are gradually penetrated and the rate of flow increases gradually. As shown in FIG. 13C, for a membrane with uniform pores, when a critical pressure is exceeded, the pores are all opened at the same time, allowing significant flow. This shows a sharp transition.

Tuning of Gating Pressures for Air, Water, and Ethanol

With a broad range of material options, the absolute and relative threshold pressures for gases and liquids can be tuned with over at least two orders of magnitude. For example, as shown in FIG. 4B, changing the pore size allows tuning of absolute and relative threshold pressures for air and water to flow through wetting liquid-filled pores, from less than 10 kPa to more than 200 kPa.

Figure 14A:
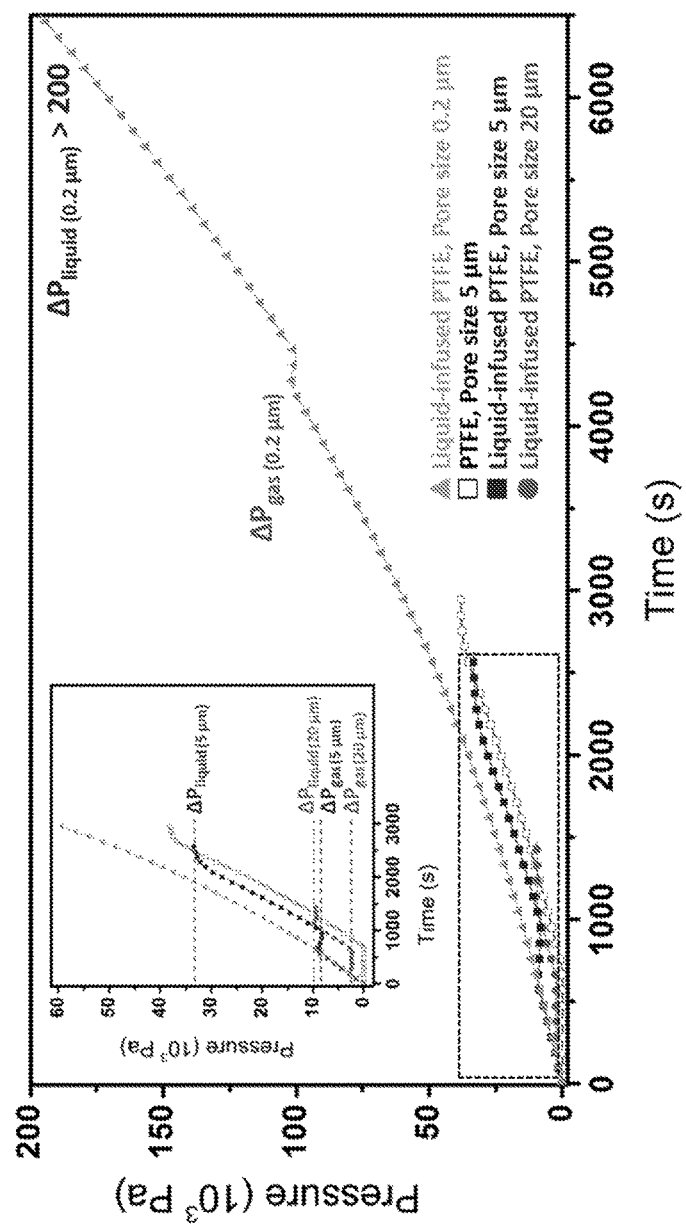
FIGS. 14A and 14B show plots of threshold pressure for different conventional porous membranes and wetting liquid-filled porous membrane in accordance with certain embodiments.

FIG. 14 shows the transmembrane pressure across PTFE membranes of different pore size and thickness with and without the wetting-liquid. As shown, $P_{threshold(gas)}$ and $P_{threshold(liquid)}$ vary based on the pore size and membrane thickness. Inset shows zoomed-in view of the $P_{threshold(gas)}$ and $P_{threshold(liquid)}$ for 5 µm and 20 µm pore size membranes with ~200 µm thickness. The 0.2 µm pore size membrane has a thickness of ~30 µm. (Flow rate 50 µL/min)

Figure 14B:
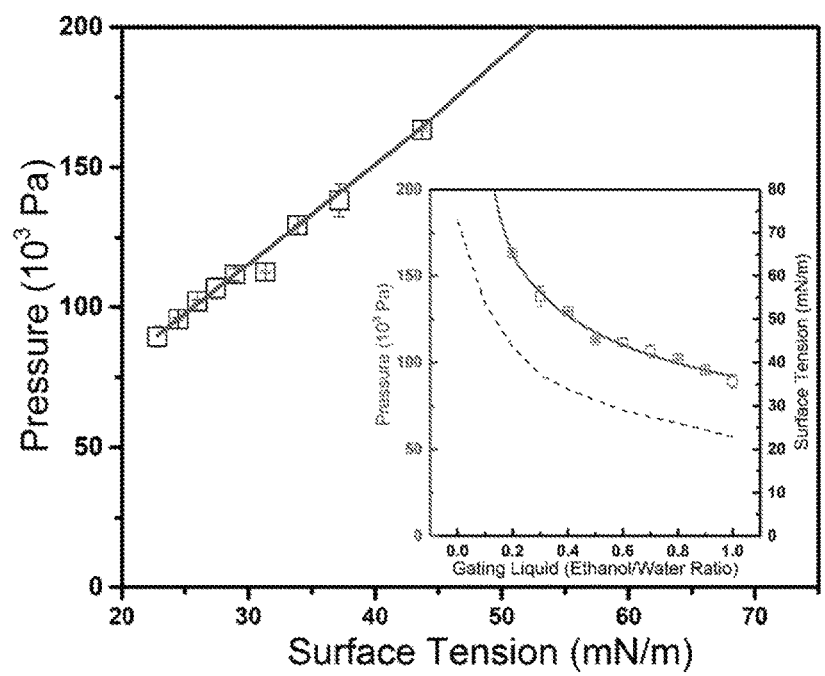

Similarly, as shown in FIGS. 4C and 14B, starting from a single material, the gating pressure can be finely tuned along a broad spectrum by systematically varying the surface tension of the wetting liquid (see also Table S4).

TABLE S4

Reference data of surface tension of water + ethanol mixtures.

| Ethanol Concentration in Water (Volume Ratio) | Surface Tension from Experiments (reference) at 19.9° C. (mN/m) |
|---|---|
| 0% | 72.88 |
| 10% | 53.43 |
| 20% | 43.71 |
| 30% | 37.16 |
| 40% | 33.88 |
| 50% | 31.36 |
| 60% | 28.95 |
| 70% | 27.45 |
| 80% | 26.00 |
| 90% | 24.49 |
| 100% | 22.85 |

Figure 15A:
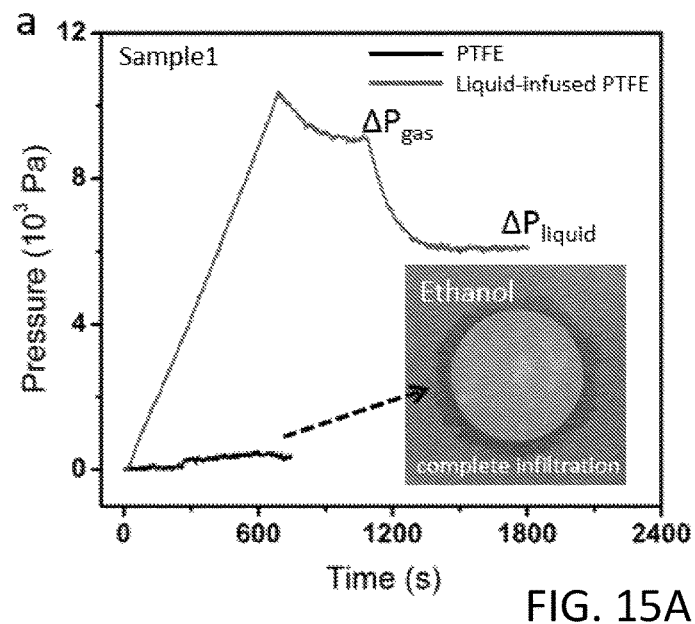
FIGS. 15A and 15B show plots of threshold pressure for conventional porous membranes and wetting liquid-filled porous membrane in accordance with certain embodiments.
Figure 15B:
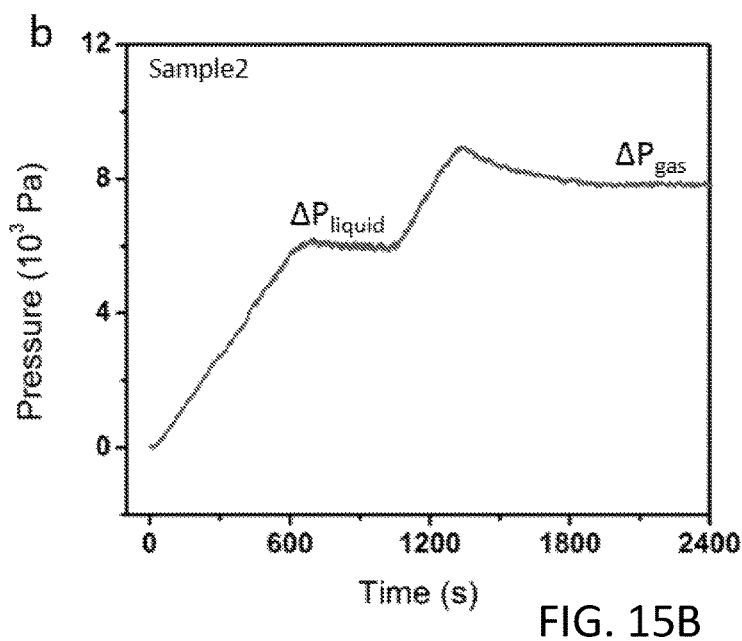

In all cases, the observed gating thresholds are independent of whether gas or liquid is flowed first. For example, FIG. 15A shows the threshold pressures as a function a time in which air is provided as the transport fluid first, followed by ethanol. The inset shows the optical image of the conventional bare PTFE membrane after adding ethanol. FIG. 15B show the opposite order in which ethanol is provided as the transport fluid first, followed by air. As shown, the threshold pressures for the respective air and ethanol do not change.

Figure 16:
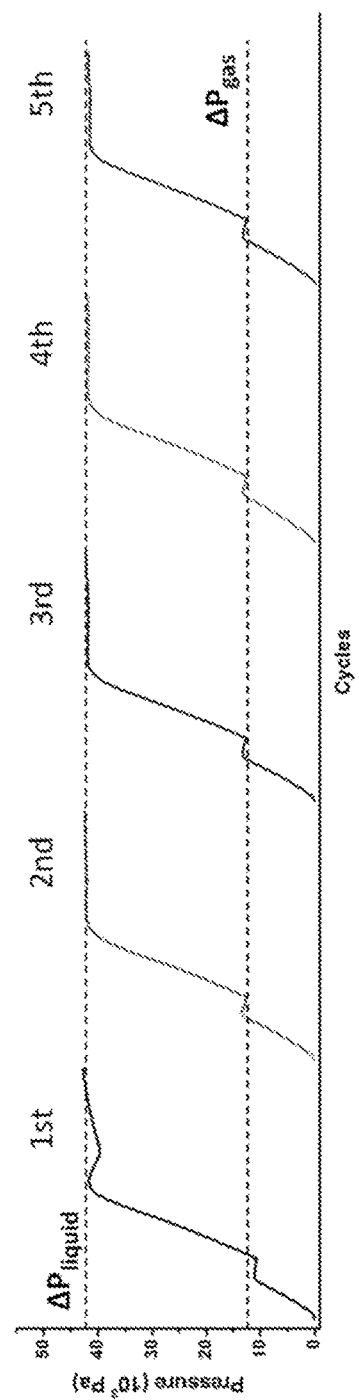

In addition, as shown in FIG. 16, the threshold pressures are stable over time and after cyclic alteration of gas and liquid (FIG. S7). Pressure was measured over time for a flow rate of 1000 µL/min. The membrane pore size was 5 µm.

Microfluidic Device Based on "Design 1" of FIG. 5B

Figure 17A:
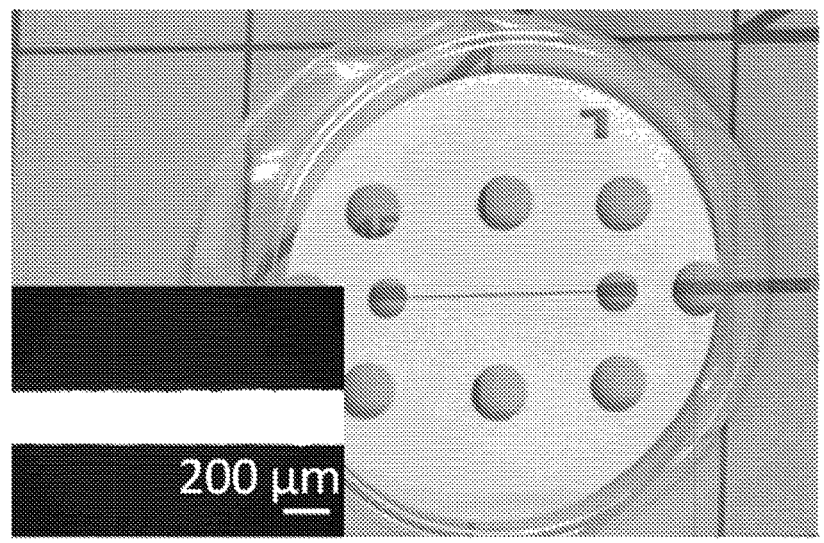
FIGS. 17A-17E show gating systems utilizing wetting liquid-filled porous membrane that allows separation of components in a transport fluid in accordance with certain embodiments.
Figure 17B:
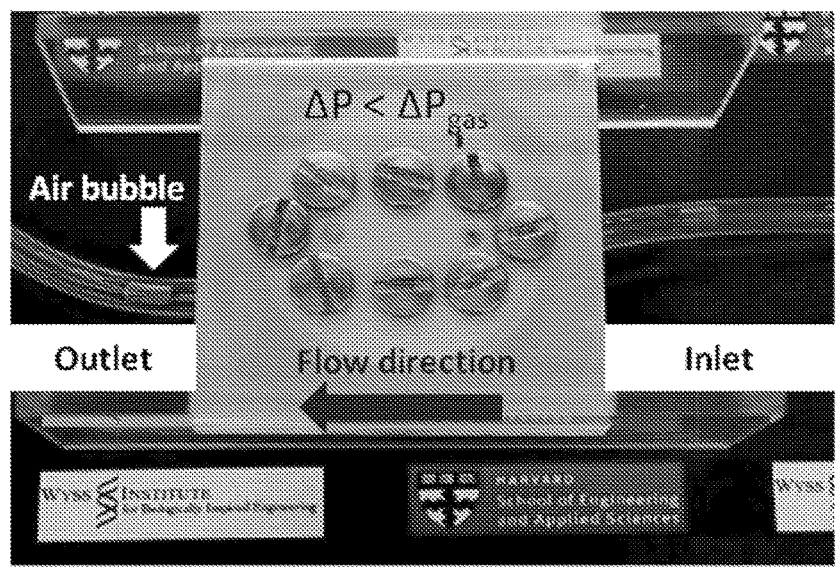
Figure 17C:
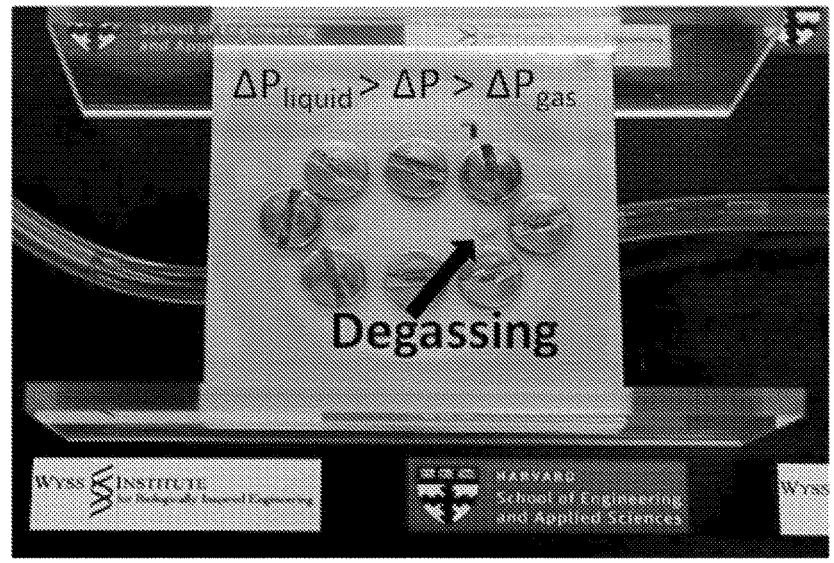
Figure 17D:
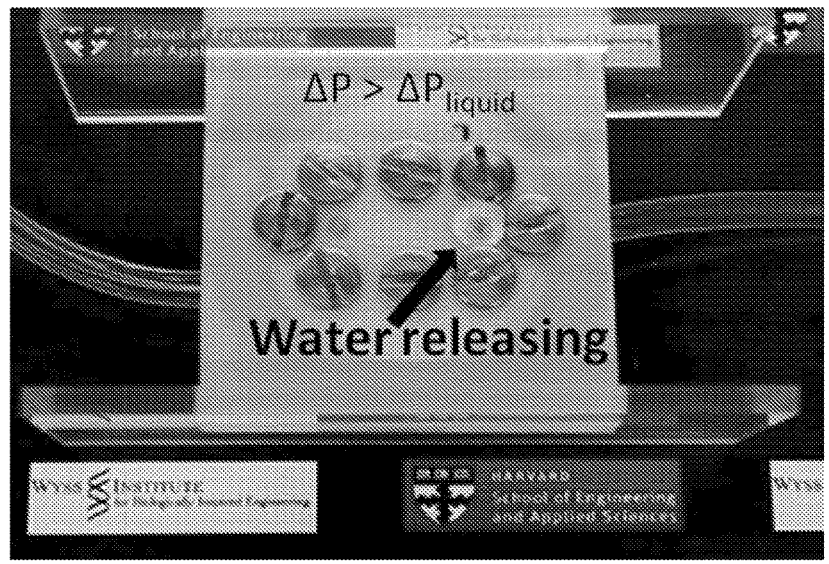
Figure 17E:
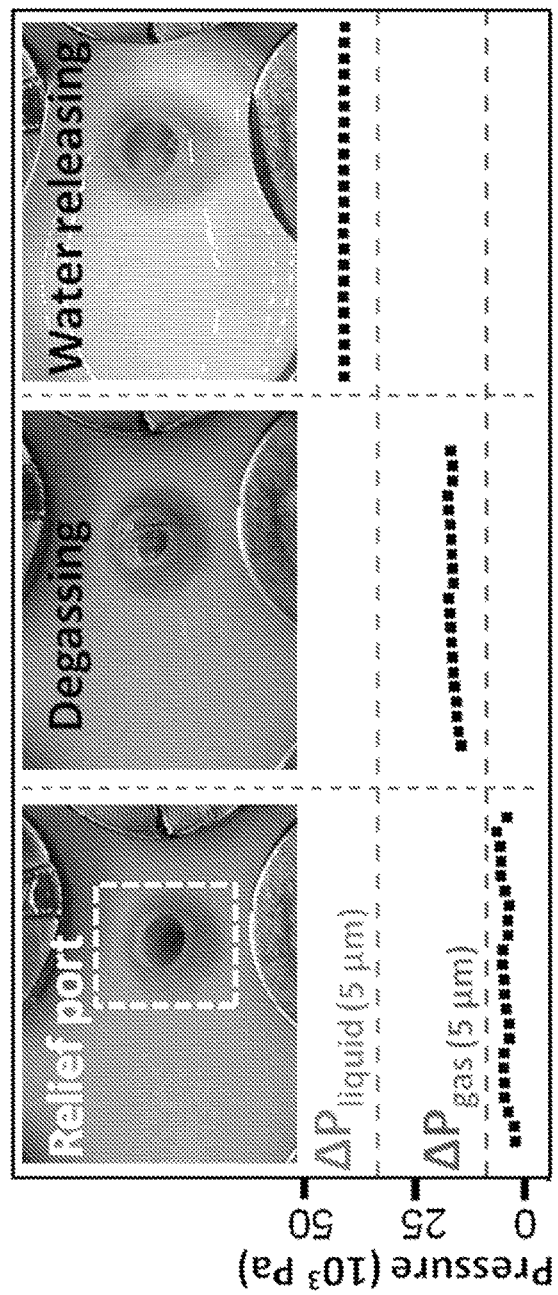

Microfluidic devices were fabricated in accordance with "Design 1" shown in FIG. 5B. FIG. 17A shows optical image of PTFE porous membrane after laser cutting (microchannel shown in inset). FIGS. 17B to 17D show different operating conditions of the device. FIG. 17B shows the condition where the operating pressure is less than $P_{threshold(gas)}$. Under such condition, neither gas nor liquid flows through the relief port. As shown in FIG. 17C, when the operating pressure is greater than $P_{threshold(gas)}$ but less than $P_{threshold(liquid)}$, gas flows through the relief port and only water flows past the outlet. As shown in FIG. 17D, when the operating pressure is greater than both $P_{threshold(gas)}$ and $P_{threshold(liquid)}$, both gas and liquid flow through the relief port. FIG. 17E shows the zoomed-in region of the relief port under these three different conditions.

Microfluidic Device Based on "Design 2" of FIG. 5B

Figure 18A:
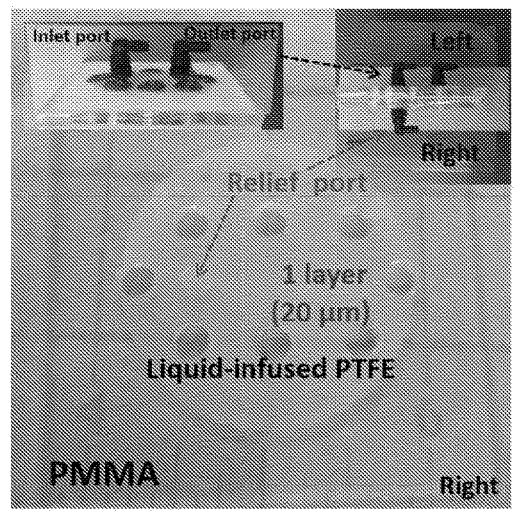
FIGS. 18A and 18B show gating systems utilizing wetting liquid-filled porous membrane that allows separation of components in a transport fluid in accordance with certain embodiments.
Figure 18B:
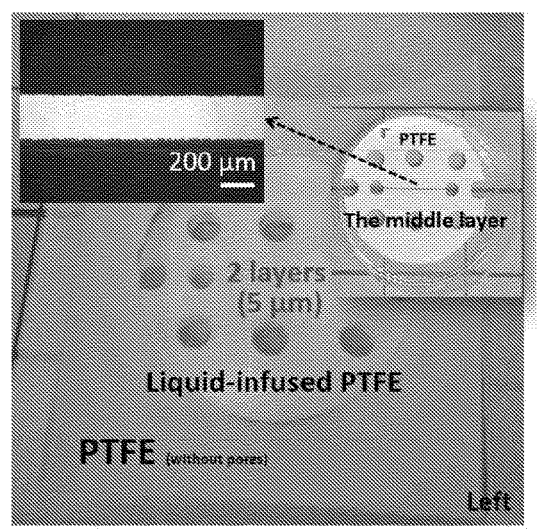

Microfluidic devices were fabricated in accordance with "Design 2" shown in FIG. 5B. FIG. 18A shows optical image of PTFE porous membrane (top layer) after laser cutting (inset shows the side and top views of the device). FIG. 18B shows an image of wetting liquid-filled PTFE (bottom layer) after laser cutting (inset shows the middle layer and microscopic image of the microchannel).

Figure 19:
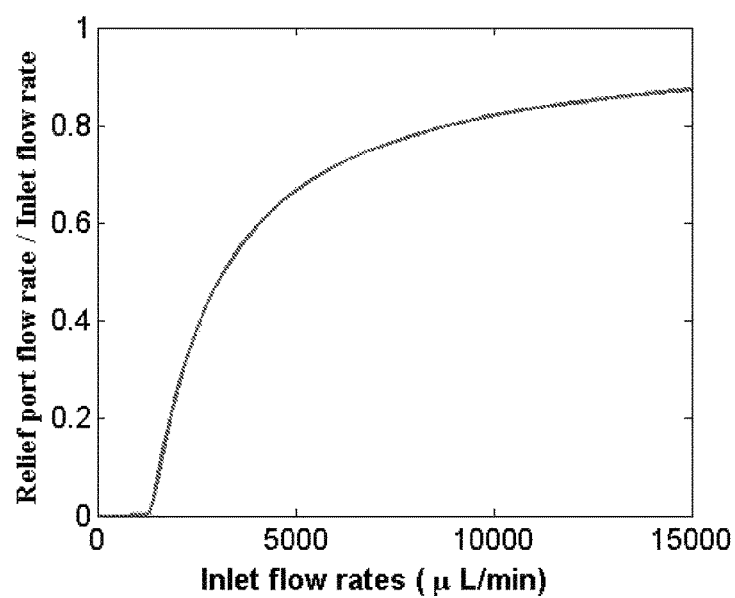
FIG. 19 shows a plot of relief port flow rate per inlet flow rate as a function of inlet flow rate for gating systems utilizing wetting liquid-filled porous membrane that allows separation of components in a transport fluid in accordance with certain embodiments.

Theoretical Modeling of the Liquid Flow in the Microfluidic Device with a Relief Port Containing a Wetting Liquid-Filled PTFE Membrane Within the microchannel, the relation between pressure and flow rate is described by the Hagen-Poiseuille equation. The pressure difference between the outside environment and the channel at the location near the relief port, $\Delta P$, can be related to the rate of flow through the outlet $Q_o$, as $$\Delta P = \frac{8\mu L_o Q_o}{\pi R_o^4},$$

where $L_o$ and $R_o$ are the length and radius of the outlet channel respectively. Under this pressure, the rate of flow through the relief port is $$Q_r = \frac{k\pi R_r^2 \Delta P}{\mu h}$$

where $R_r$ is the radius of the relief port. Conservation of mass gives $$Q_i = Q_r + Q_o$$

where $Q_i$ is the rate of flow through the inlet. With the dimensions used in the microfluidic device, the flow rate of liquid through the relief port relative to the overall flow rate through the inlet is plotted as a function of the overall flow rate through the inlet, as shown in FIG. 19.

Controllable Separation of a 3-Phase Air/Water/Oil Mixture

Figure 20A:
FIG. 20A shows immiscibility of crude oil with Krytox oil in accordance with certain embodiments.
Figure 20B:
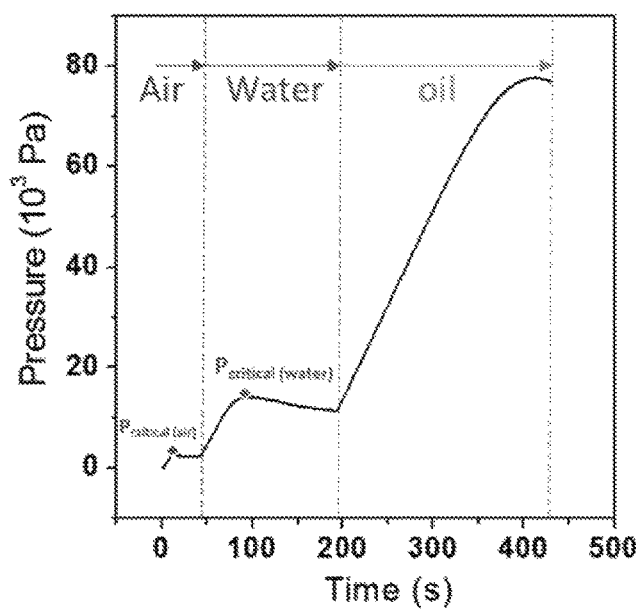
FIG. 20B shows a plot of the threshold pressure for air, water and crude oil passing through Krytox oil-filled porous membrane in accordance with certain embodiments.

Crude oil and water in a volume ratio of 1:1 were shaken in a vial to form an air/water/crude oil mixture. As shown in FIG. 20A, crude oil was separately verified to be immiscible with Krytox oil. Moreover, as shown in FIG. 20B, air, water, and crude oil were each shown to have a distinct critical pressure for transport through a Krytox-infused PTFE membrane (average pore size of 20 μm and flow rate of 1000 μL/min).

The high threshold pressure for oil may be due to its high viscosity, consistent with the model described above, in which the viscosity of the transport liquid (but not of the gating liquid) is a parameter.

Figure 20C:
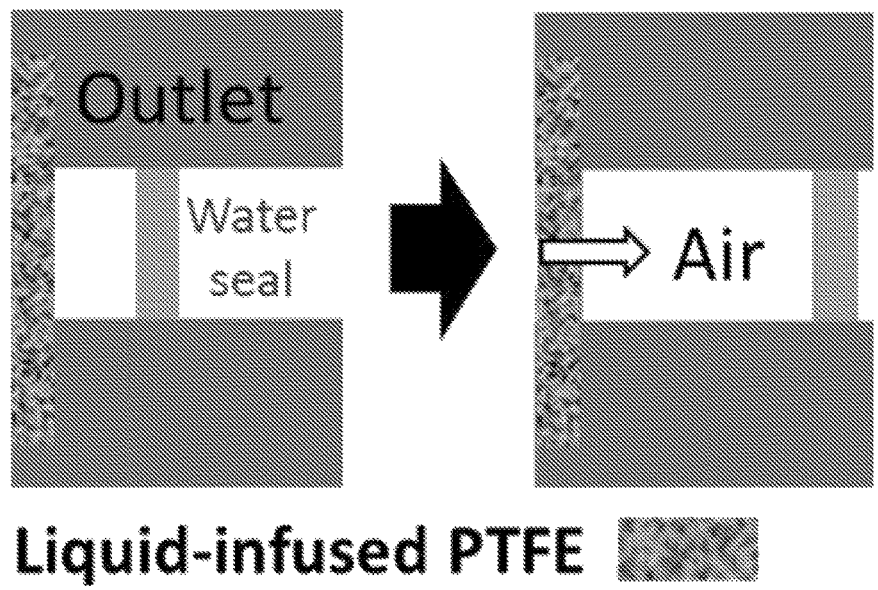
FIG. 20C shows a schematic diagram demonstrating separation of water from a transport fluid in accordance with certain embodiments.

To observe the air coming out of the outlet, as shown in FIG. 20C, a water droplet was used to seal the tube connected to the outlet as an indicator.

Antifouling Experiments

Figure 21A:
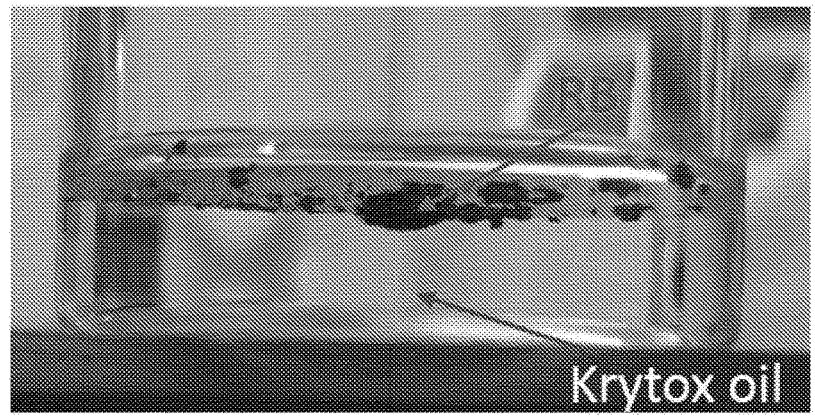
FIGS. 21A and 21B shows immiscibility of Rhodamine B with Krytox oil in accordance with certain embodiments.
Figure 21B:
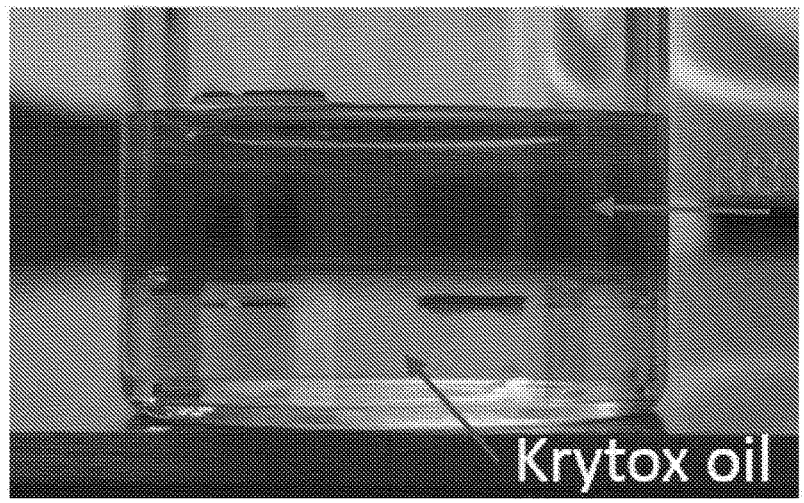

This pore-gating strategy further provides robust nonfouling behavior for solutions and suspensions. FIGS. 21A and 21B confirm that Rhodamine B dye (RB) power does not dissolve in Krytox oil and that the RB solution is immiscible with Krytox oil.

Figure 22A:
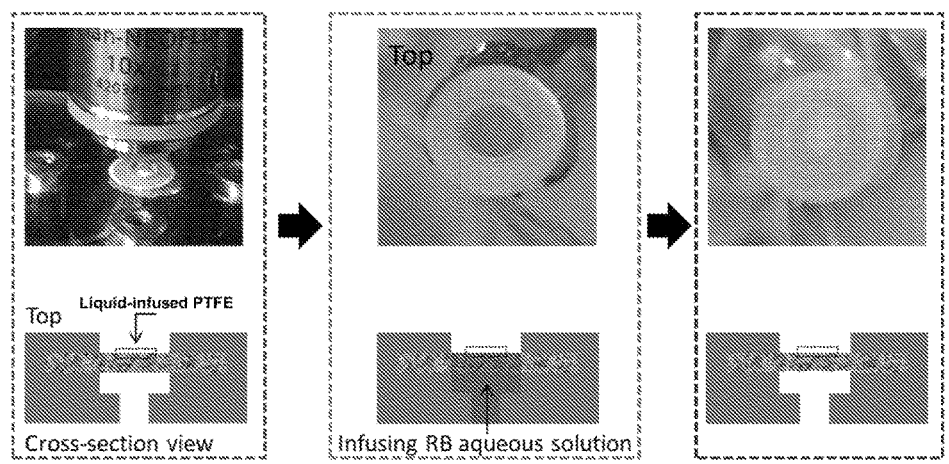
FIG. 22A shows a flow configuration for real-time confocal imaging of wetting liquid-filled porous membrane before, during and after RB aqueous flow in accordance with certain embodiments.
Figure 22B:
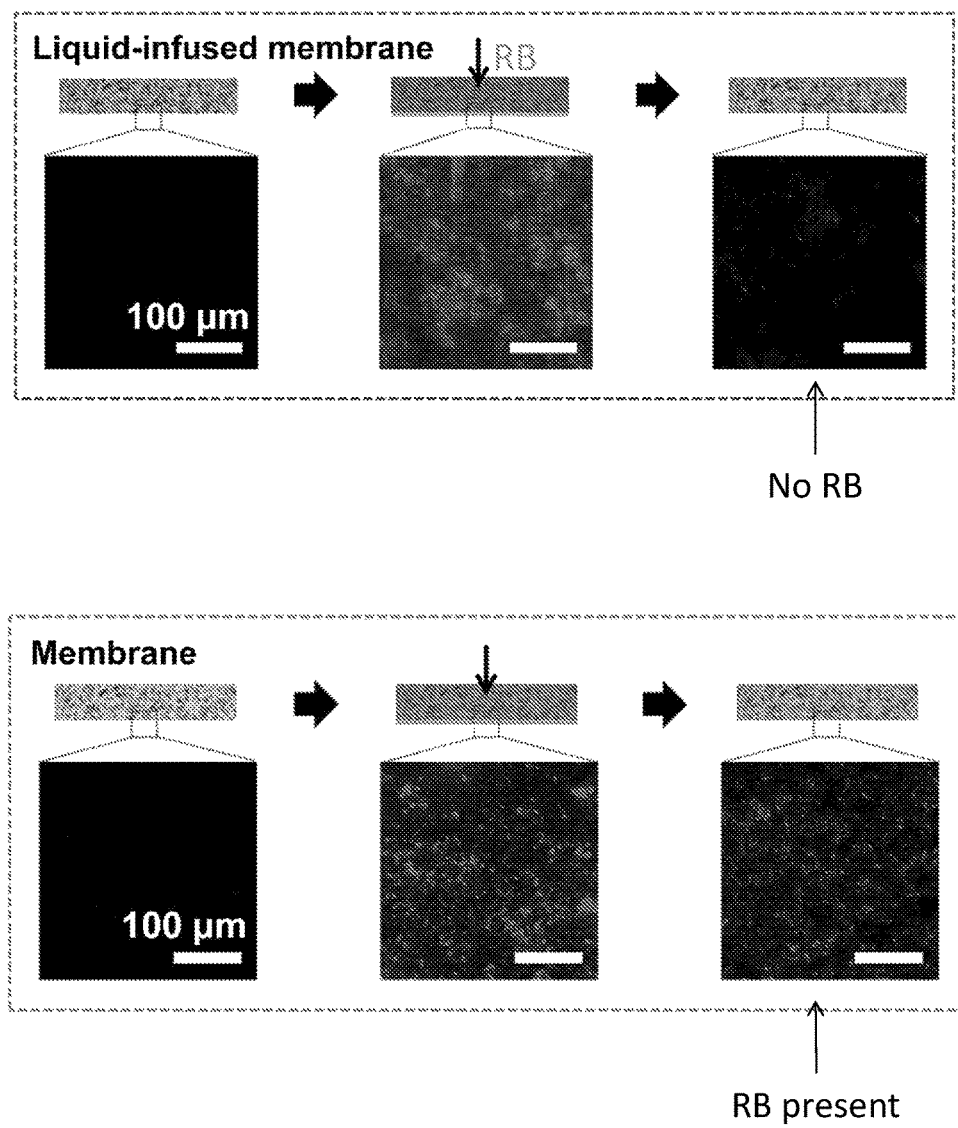
FIG. 22B shows real-time confocal images of a wetting liquid-filled porous material (top) or of the porous material without the wetting liquid (bottom) before, during, and after flowing an aqueous solution of Rhodamine B dye (RB) in accordance with certain embodiments.

The flow configuration for real-time confocal imaging of the wetting liquid-filled porous membrane before, during and after RB aqueous flow is shown in FIG. 22A. FIG. 22B shows real-time confocal images of a wetting liquid-filled porous material (top) or of the porous material without the wetting liquid (bottom) before, during, and after flowing an aqueous solution of Rhodamine B dye (RB). As shown, RB retention after flow is observable only in the PTFE membrane without the gating liquid.

Figure 23A:
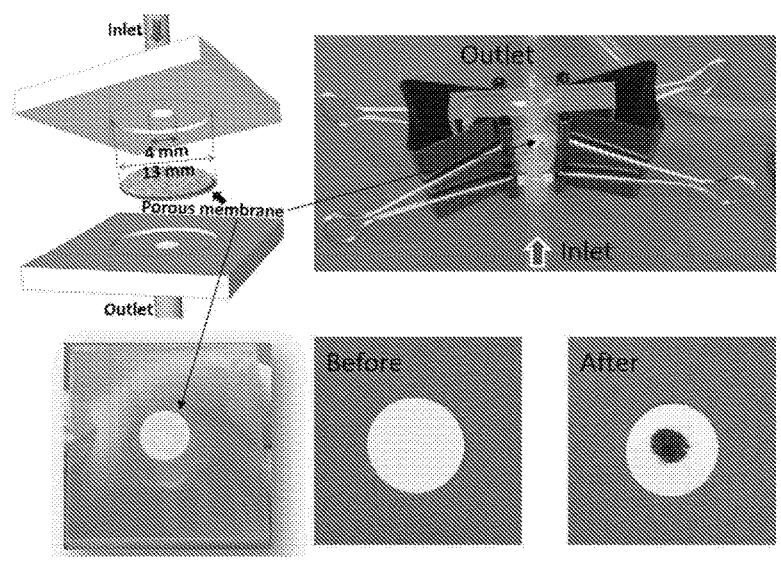
FIG. 23A shows an antifouling test setup in accordance with certain embodiments.
Figure 23B:
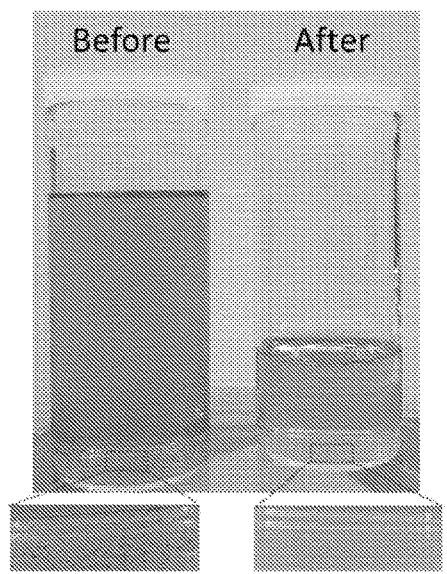
FIG. 23B shows a suspension of 4-benzoylamino-2,5-diethoxybenzenediazonium particles (0.54 mg/mL in water, 20° C.) applied to a wetting liquid-filled porous membrane in accordance with certain embodiments.
Figure 23C:
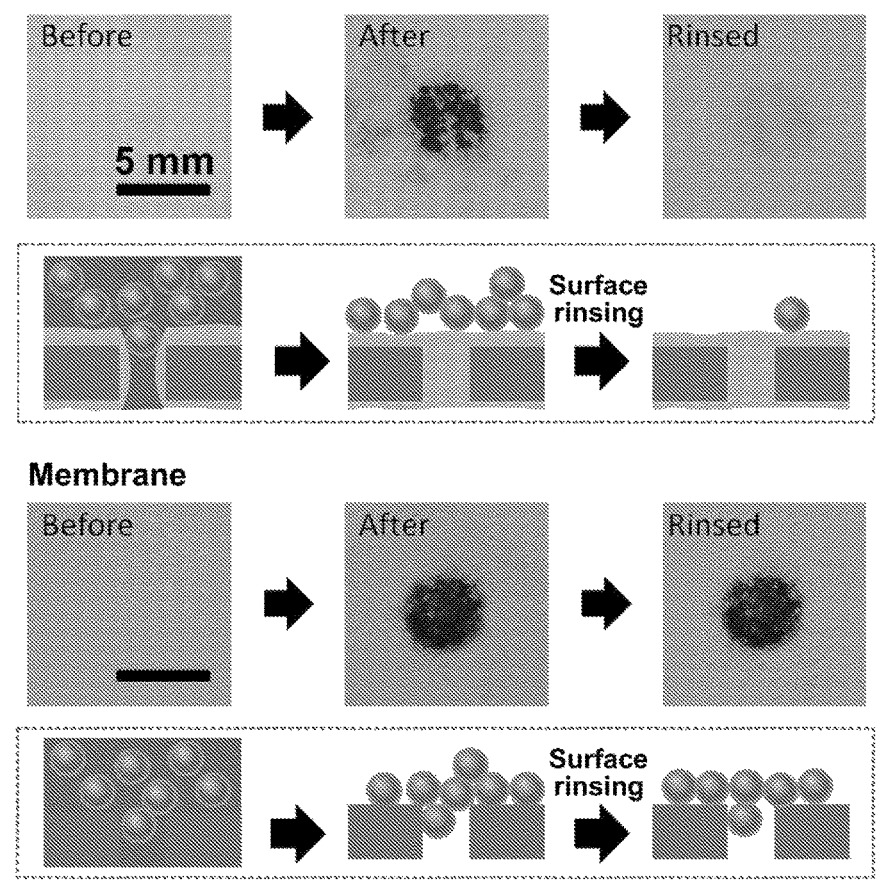
FIG. 23C shows flowing a suspension of 4-Benzoylamino-2,5-diethoxybenzenediazonium particles (1000 µL/min) through a conventional bare porous membrane (bottom) and a wetting liquid-filled porous material (top) in accordance with certain embodiments.

For suspensions containing particles larger than the pore diameter, the combination of a fluid-lined pore and a contiguous fluid-lined outer surface enables non-fouling separation behavior. FIG. 23A shows the antifouling test setup. FIG. 23B shows a suspension of 4-benzoylamino-2,5-diethoxybenzenediazonium particles (0.54 mg/mL in water, 20° C.) applied to the membrane. The flow-through liquid contains no visible precipitate. (Flow rate 1000 μL/min). As shown in FIG. 23C, flowing a suspension of 4-Benzoylamino-2,5-diethoxybenzenediazonium particles (1000 □L/min) through a wetting liquid-filled porous material (top) leaves salt particles suspended on the liquid surface after the pore closes (top, center), and the particles are easily collected by a gentle surface rinse (top, right). The conventional bare membrane (bottom) traps the salts both in and around the pores (bottom, center) and resists repeated rinsing (bottom, right).

Figure 23D:
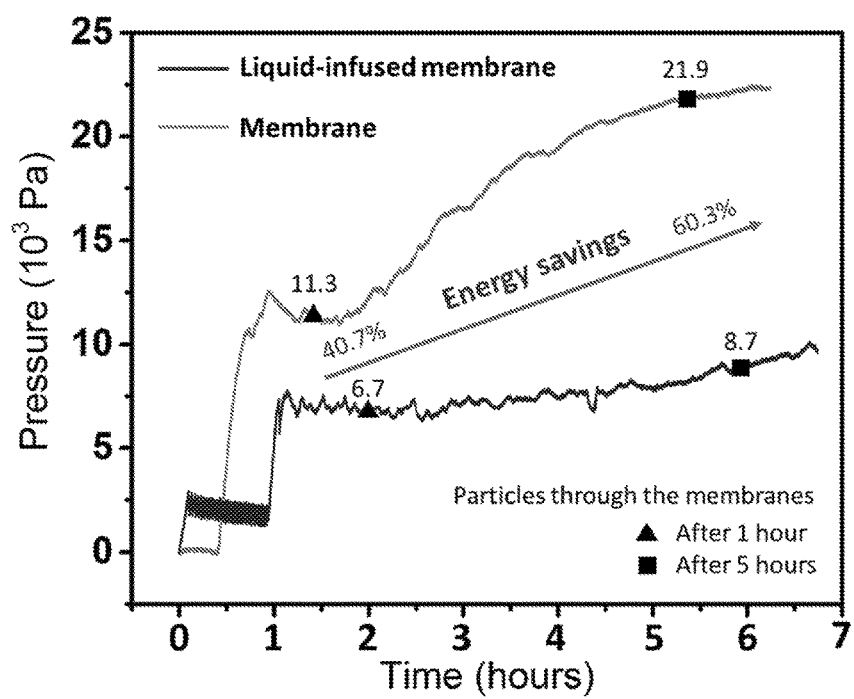
FIG. 23D shows the pressure for transporting a suspension of 4-Benzoylamino-2,5-diethoxybenzenediazonium particles in water through a conventional porous membrane and a wetting liquid-filled PTFE membrane in accordance with certain embodiments.

Moreover, FIG. 23D shows the pressure for transporting a suspension of 4-Benzoylamino-2,5-diethoxybenzenediazonium particles in water through a wetting liquid-filled PTFE membrane to be initially 38.7% lower than through the pure membrane and about 56.5% lower after 4.5 hours' operation at a flow rate of 50 μL/min. By integrating antifouling behavior and tunable pressure in one system, the gating mechanism not only provides the flexibility to have a lower working pressure than conventional membranes but also prevents the working pressure from building up over time, a problem that commonly occurs in conventional membranes due to uncontrolled fouling. This combined behavior can lead to significant energy savings over longterm operation.

Figure 23E:
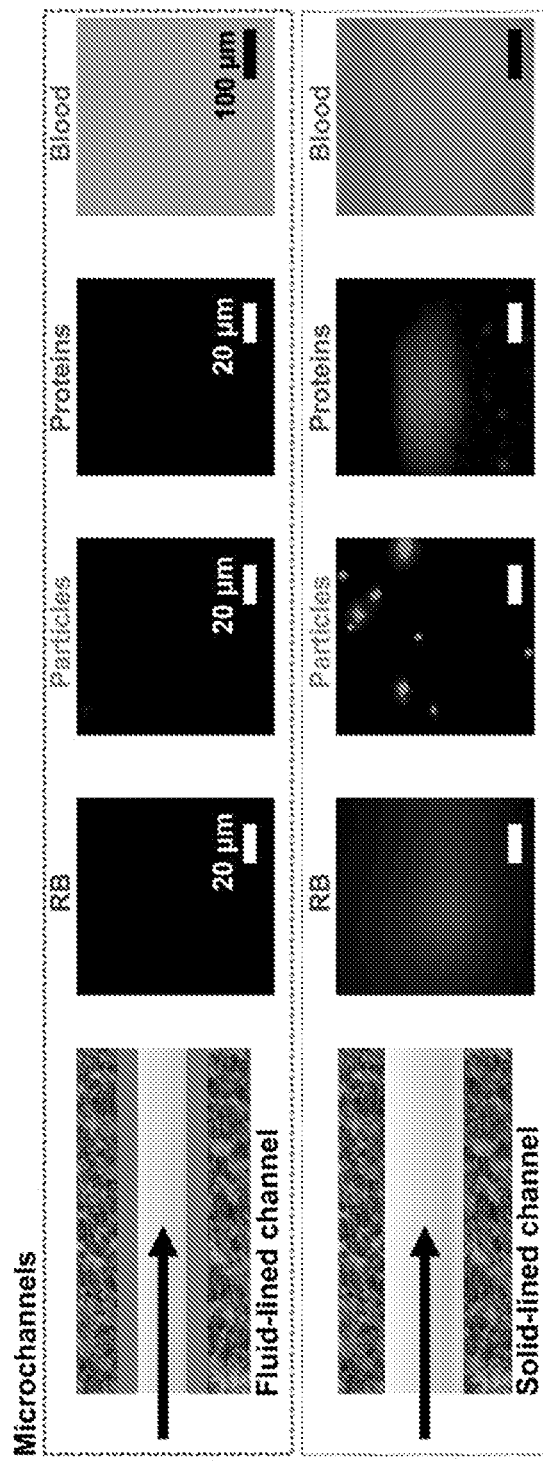
FIG. 23E shows conventional bare PTFE channel for each substance (bottom) that is fouled with Rhodamine B solution and a wetting liquid-lined PTFE microchannel that resists fouling (top) by RB solution in accordance with certain embodiments.

The idea of using a fluid lining to prevent fouling inside a nano- or micropore can be extended to the interior of much longer microfluidic channels. A microfluidic channel lined with a wetting liquid-filled porous membrane shows no trace of Rhodamine B, fluorescent microparticles, fluorescent protein, or blood following flow, while the channels without the fluid lining retain substantial residue in each case. FIG. 23E shows wetting liquid-lined PTFE microchannel that resists fouling (top) by RB solution, suspended microparticles, protein solution, (fluorescent images) and blood (optical image). In contrast, for a microchannel that does not have the wetting liquid, fouling residue is observed inside the conventional bare PTFE channel for each substance (bottom). Combined with the antifouling/nontrapping properties of both the interior and the outer surface of the liquid-gated pores, these results support the possibility of designing comprehensive microfluidic systems that both resist fouling and enable tunable gated flow of complex multiphase substances.

High Pressure Stable Metallic Wetting Liquid-Filled Porous Membranes with Controllable Gas/Liquid Selectivity and Antifouling Properties Materials:

Sodium tungstate dehydrate, nickel chloride, boric acid, cobalt acetate were purchased from Sigma-Aldrich (USA), potassium nitrate was purchased from J.T. Baker (USA). All chemicals were of the ACS reagent grade and were used as received. MilliQ DI water was used in all experiments; acetone and ethanol (200-Proof) were purchased from VWR stock room. Phosphate ester with mixed length of fluorinated alkyl chains (FS-100) was purchased from Chemguard (USA). DuPont Krytox® GPL K103 lubricant was purchased from DuPont (USA). AISI 304 and 316 grade stainless steel foils were purchased from McMaster-Carr. Polypropylene porous membranes (PP membranes, pore size 0.45 μm) were purchased from Sterlitech Corporation (USA).

Membrane Fabrication:

The stainless steel membranes were created by electrochemical etching in a standard 50 mL two-electrode-cell using Keithley 2450 SourceMeter® unit. Before being etched, stainless steel foil was cleaned in aqueous detergent (Alcojet, USA) with sonication, rinsed with acetone and DI water, and finally dried with N2 stream at room temperature. The etching process was carried out under galvanostatic conditions of constant current density I=0.2 A $cm^{-2}$ with the varied etching time of 10-80 s in a freshly-prepared naturally-aerated solution at 60° C. with continuous stirring. 0.5 M H3BO3 was added into 2.5 M NiCl2 electrolyte solution as a pH buffer agent. AISI 304 and 316 stainless steel foils with the thickness of 25-100 μm (but the same area of 20×20 mm2 for all the samples) were used as an anode and a Cu mesh with similar dimensions was used as a cathode.

Surface Modification with Tungstete Films (Method 1):

The electrochemical deposition of porous tungstete films was performed according to the previously-reported procedure. Briefly, an aqueous solution of sodium tungstate (0.5 M) was used as the electrolyte. The electrodeposition was performed in a standard three-electrode-cell using potentiostat/galvanostat (Princeton Applied Research, VersaSTAT3-200) and VersaStudio software (Princeton Applied Research). All measurements were carried out at room temperature without stirring or deaeration of the solution. Stainless steel foil was used as the working electrode after cleaning it with aqueous detergent (Alcojet, USA), rinsing with acetone and DI water and drying with N2 stream at room temperature. The anode was a Pt gauze (10×20 mm) and the reference electrode was an Ag|AgCl NaCl(sat) (BASi, MF-2052). All potential values are referred regarding to this reference electrode. The cathodic electrochemical deposition was performed at a square waveform pulse potential with a pulse duration of 10 s separated by intervals of 10 s. The voltage of −1.5 V was applied for 12 h. After deposition, samples were removed from the solution, extensively rinsed with DI water and dried with N2 stream at room temperature.

Surface Modification with Cobalt Hydroxide Films (Method 2):

Cobalt hydroxide films on stainless steel were prepared by electrochemical deposition using a standard two-electrode-cell using BK Precision 1671A DC power supply. AISI 304 and 316 stainless steel foils with the thicknesses of 25-50 μm have been used as a working electrode. A Cu mesh was used as a counter electrode. Only freshly-prepared naturally-aerated solutions have been used without stirring. The electrodeposition process was carried out under galvanostatic conditions of the current density I=0.5 mA cm$^{-2}$ with the electrolysis duration of 30 min at room temperature. The as-deposited samples were thoroughly washed with DI water and dried with N2 stream at room temperature.

FIG. 24 shows SEM images of pits produced by electrochemical etching as a function of etching time: (a) 20 s, (b) 40 s and (c) 80 s. Sample in (b) was deposited with microscale cobalt oxide film (Method 2) and sample in (c) with nanoscale tungsten oxide film (Method 1). Scale bars in (a-c) are 10 μm (5 μm in insets).

As shown, permeable stainless steel membranes have been created by the electrochemical etching procedure. Stainless steels are known for their corrosion resistance owing to nanometer scale passive oxide films that are naturally formed on the metal surface. Such protective nanoscale films, however, often susceptible to pitting corrosion (i.e. a localized form of etching), that occurs when these surfaces exposed to aggressive anionic species such as chloride ions. It is one of the most common causes of metallic surfaces failure due to autocatalytic nature of this process. The mechanism of pitting corrosion is well known; pits propagate within a localized zone in which aggressive conditions are developed. The pitting process is random and stochastic in nature; however, it is likely occurs on the manganese sulfide inclusions.

The stainless steel membranes were prepared by electrochemical etching under galvanostatic conditions of current density I=0.1 A cm$^{-2}$ using standard two-electrode-cell in a freshly-prepared, aqueous, naturally-aerated chloride containing solution at 60° C. with continuous stirring. This temperature was chosen to lower the pitting potential and to provide a stable pitting condition, while the concentration of chloride ions was chosen to decay the passive enhanced oxide metal dissolution. AISI 304 stainless steel foils with thicknesses of 25-50 μm were used as an anode and a Cu mesh was used as a cathode. Under the electric current condition, initial pores created on stainless steel surface had a hemispherical shape with polished edges (see FIG. 24A). The pore diameter was maintained by increase the etching time (see FIGS. 24A-24C), i.e. ~2 μm for 20 s and >20 μm for 80 s of etching of 25 μm thickness stainless steel. The areal density of pit was calculated from optical microscope images and was estimated as 1830±300 pits cm$^{-2}$.

Surface Modification with Low Surface Energy Chemicals:

The metal-oxide deposited samples were immersed in 1 wt % fluorosurfactant (phosphate ester with mixed length of fluorinated alkyl chains) dissolved in mixture of 95:5 v/v % ethanol/water for 30 min at 70° C. After functionalization, samples were rinsed with ethanol and dried under N2 stream at room temperature.

Formation of Wetting Liquid-Filled Porous Membranes:

Wetting liquid-filled porous membranes were generated by infusing low-surface-tension liquids (Krytox®103 (K103)) into a variety of porous membranes. They were prepared by dropping ~10 μL cm$^{-2}$ K103 on the modified membranes surfaces and uniform coverage was achieved by tilting.

Figure 25:
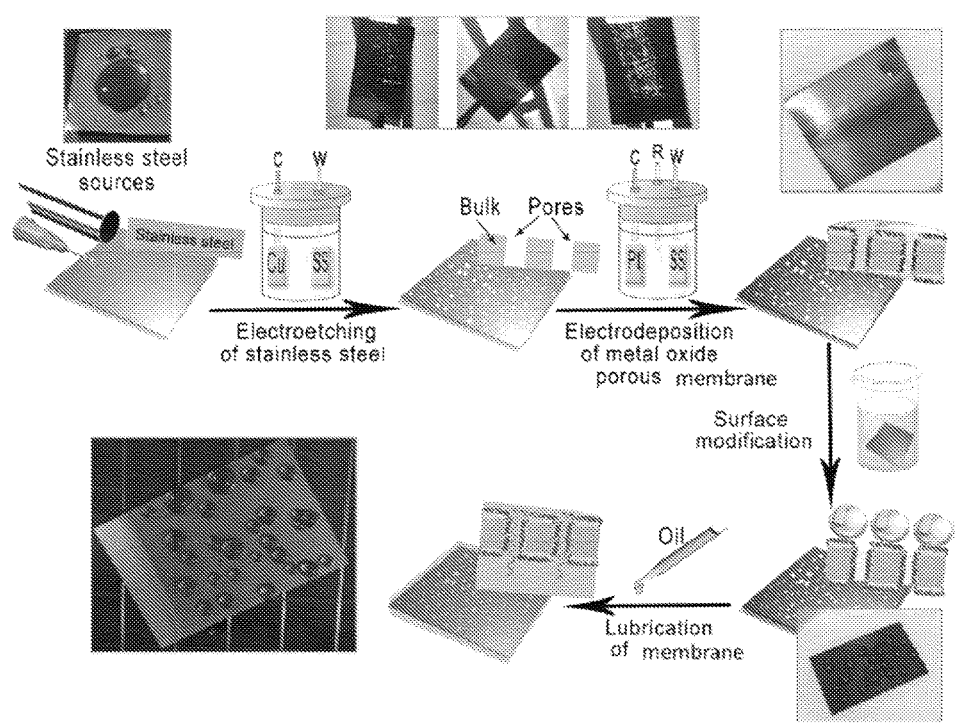
FIG. 25 shows a schematic representation and photographs of the preparation of wetting liquid-filled stainless steel porous membranes by the electrochemical etching and the deposition of porous metal oxide films in accordance with certain embodiments.

FIG. 25 shows a schematic representation of the preparation of wetting liquid-filled stainless steel porous membranes by the electrochemical etching and the deposition of porous metal oxide films. Photographs after each preparation step are shown.

Surface Characterization:

A Zeiss FE-SEM Ultra Plus scanning electron microscope with an In-lens SE and Everhart-Thornley SE detectors at acceleration voltage of 15 kV was used to determine the surface morphology.

Transmembrane Pressure Measurements:

The transmembrane properties of hydrophilic and hydrophobic porous membranes with and without infused liquids have been determined by measuring the transmembrane pressure (ΔP) during flow of DI water. ΔP was measured by wet/wet current output differential pressure transmitter (PX273-030DI) from OMEGA Engineering Inc. (Stamford, Conn., USA). A porous membrane (average diameter=13 mm) was mounted between two chambers as shown in FIG. 2a. A flow rate of 1000 μL min$^{-1}$ was used in all experiments.

Fluorescence Measurements:

Zeiss Confocal Laser Scanning Microscope from Carl Zeiss Microscopy GmbH, Jena, Germany, (LSM 700) was used in the fluorescent measurements.

Mechanical Characterization:

Mechanical properties of stainless steel substrates with and without deposited tungstete films have been studied by nanoindentation technique (NanoIndenter G200, Agilent Technologies, USA). Continuous stiffness measurements (CSM) mode was used to determine elastic modulus and hardness of the deposited porous films. The nanoindenter is equipped with a Berkovich three-sided diamond pyramid indenter with centerline-to-face angle of 65.3° and a 17.8 nm radius at the tip of the indenter. The nanoindentation was carried out using a constant indentation strain rate of 0.05 s$^{-1}$, CSM amplitude was 2 nm with a frequency of 75 Hz and indent depth of 300 nm. The device is equipped with an optical microscope. Series of 15-25 indents were made for each sample probe, to obtain a better statistics as well as to cover large surface area. Distance between every measured point was 100 μm.

Wetting Characterization:

Water contact angle (CA), contact angle hysteresis (CAH) and sliding angle (SA) measurements were performed using drop shape analysis system DSA100 (Kruss, Germany). Small droplets of water (10 μL) were placed on multiple areas over the surface of the samples and observed using a video camera. The angle was then estimated from the photos taken by the video camera using photo analysis software. The average CA, CAH and SA were obtained by measuring at least 5 different locations on the sample.

Here, electrochemically-etched stainless steel was utilized as a core porous membrane material. Surface roughening has been achieved by the electrochemical deposition of metal oxide films, which in addition allowed the chemical modification of the pore surface with low surface energy compounds to match chemical affinity of the pore surface with a lubricant. The flexibility of the fabrication process enables obtaining stainless steel membranes with various pore sizes and porosities. In addition, the electrochemically deposited porous films on stainless steel shows (1) the mechanical robustness similar to the bare substrate, (2) the wetting stability up to 200° C. and (3) increased resistance to corrosion and biocorrosion in wetting liquid-filled porous membrane configuration. The gating systems were applied to control gas/liquid separation and demonstrated multi-cycle antifouling property.

Figures 26A, 26B, 26C, 26D:
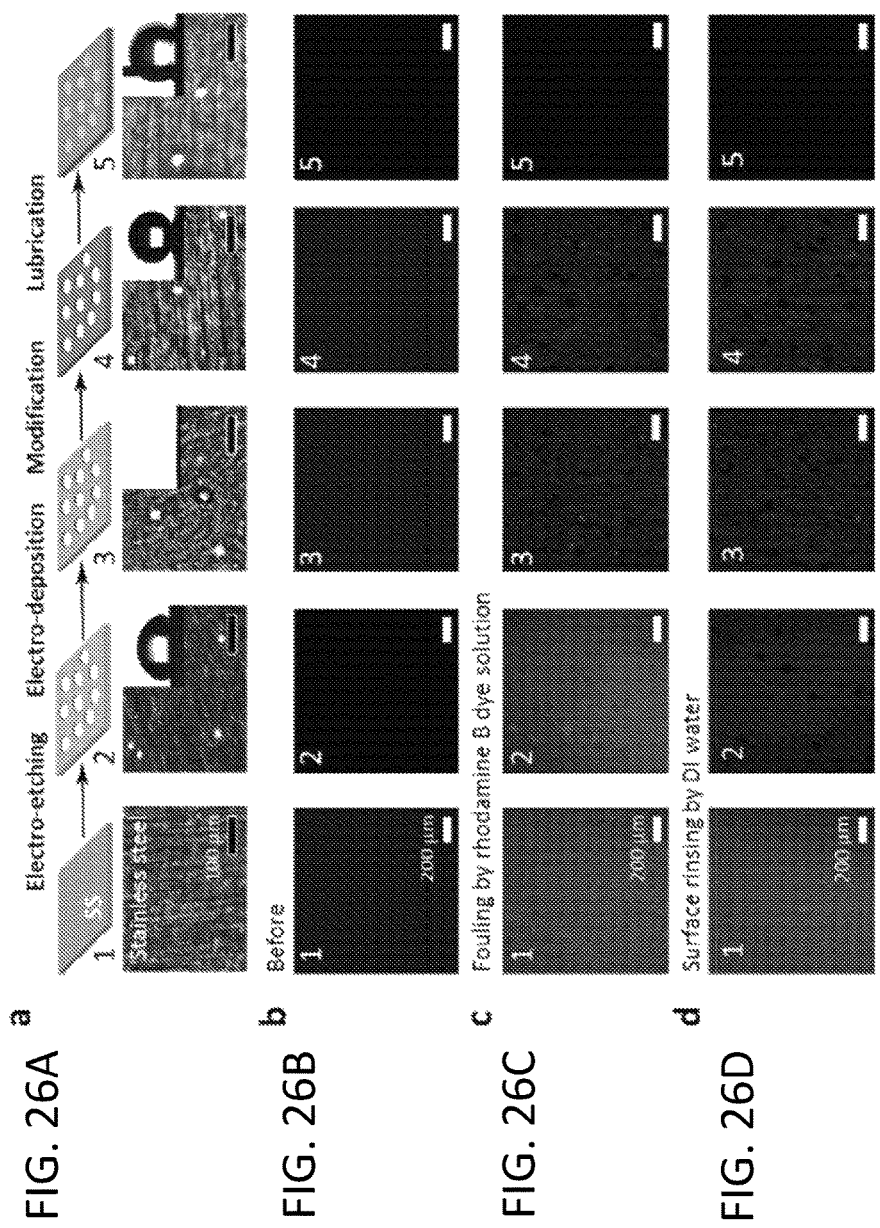
FIG. 26A shows the fabrication method to prepare stainless steel-based fluid-based gating systems in accordance with certain embodiments.
FIG. 26B shows no Rhodamine B fluorescent signal after each preparation step before Rhodamine B exposure in accordance with certain embodiments.
FIGS. 26C-26D show complete absence of fluorescent signal for wetting liquid-filled metallic porous membranes in accordance with certain embodiments.

FIG. 26A shows the fabrication method to prepare stainless steel-based fluid-based gating systems. The permeable metallic membranes have been prepared by electrochemical etching of austenitic grade stainless steel (AISI 304 and 316) foils (FIG. 26A, Steps 1-2) followed by the electrochemical plating from aqueous solutions of micro- or nano-scale porous metal oxide films such as the hydrated tungsten oxide (tungstete) and the cobalt oxide/hydroxide (FIG. 26A, Step 3, and FIG. 25). The deposition of porous metal oxide films does not significantly change the mechanical properties of the stainless steel. For example, Young's modulus and hardness of electrodeposited porous tungstete films, measured by nanoindentation technique, shows values of $E=39.2\pm17.2$ GPa ($56.2\pm16.4$ GPa for bare stainless steel) and $H=0.87\pm0.47$ GPa ($0.98\pm0.41$ GPa for bare stainless steel). Step 4 not just aims matching the surface chemical affinity for wetting liquid infusion for modification of the membrane surface with low surface tension lubricants, but also keeping a constant lubricant level inside the membrane pores and on the membrane surface (FIG. 26A, Step 5). The superior mechanical stability of the core membrane material and deposited metal oxide film will keep membrane properties under applied high pressure conditions.

Figure 27:
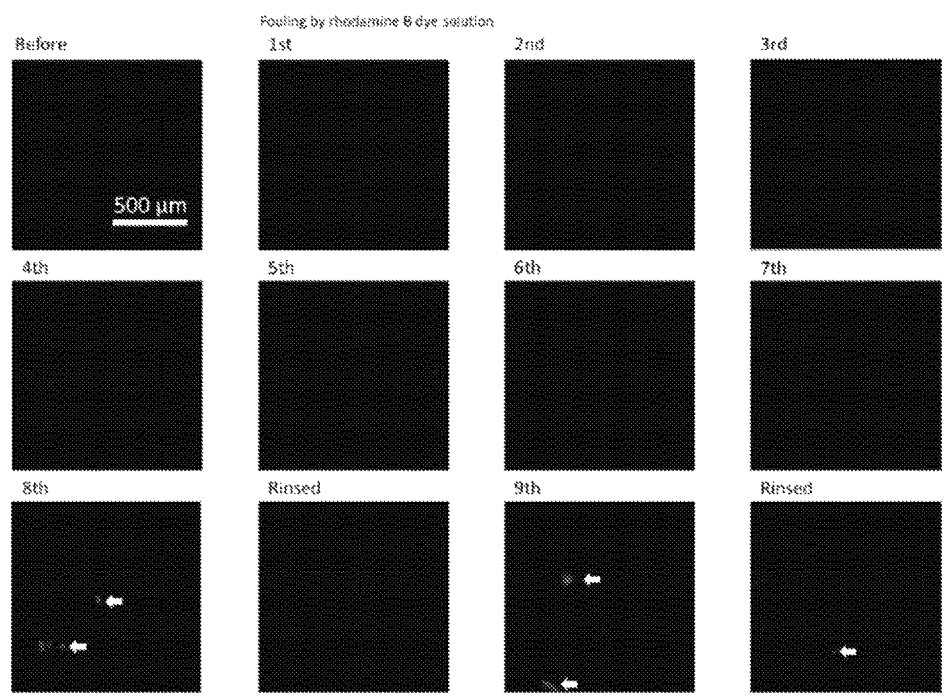
FIG. 27 shows resistance to Rhodamine B fouling for 7 cycles of fouling tests in accordance with certain embodiments.

Accumulation of chemical and biological species on the membrane surface and inside the pores leads to a significant loss of the designed membrane properties. Here, the chemical fouling property of the metal-based membranes has been examined by measuring the fluorescent signals after exposure to aqueous solution of Rhodamine B dye (RB). The RB solution was dropped on the membrane surface and kept for 10 min, then rinsed with DI water. Every preparation step of the metal-based membranes was tested and their antifouling performance has been recorded and compared before and after rinsing with DI water (FIGS. 26A and 26B, Steps 1-5). FIG. 26B shows no RB fluorescent signal after each preparation step before RB exposure, while FIGS. 26C and 26D show a significant amount of the residual RB contaminating the membrane surface even for step 4 (i.e. superhydrophobic membranes). In contrast, under the same experimental conditions, after the wetting liquid is added (Step 5), the membranes demonstrate excellent resistance to RB contamination (FIGS. 26C and 26D) displaying complete absence of fluorescent signal. This fouling and rinsing procedure was repeated multiple times and have been found to be resistive to 7 cycles of the procedure without washing, indicating a strong chemical affinity of the membrane and the lubricant. FIG. 27 shows the excellent resistance to RB fouling for 7 cycles of fouling tests. Fluorescent microscope images of the same membrane were taken after each cycle of fouling experiment, with the same focal distance and fluorescent signal amplification. (Scale bar is 500 µm for all images.) At the 8th test, the surface of the membrane can still be completely clean by DI water rinsing. But after 9th test, there is a tiny RB drop let after DI water rinsing (see arrow), and it could be further improved by optimizing the surface properties.

Figure 24A:
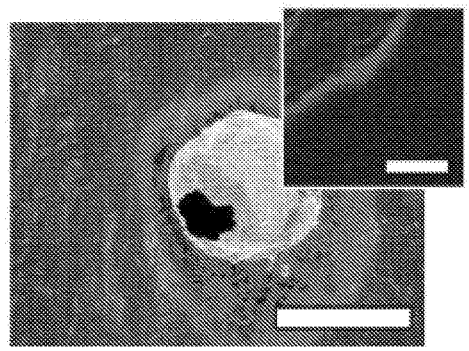
FIGS. 24A-24C show different metallic porous membranes that can be utilized in accordance with certain embodiments.
Figure 24B:
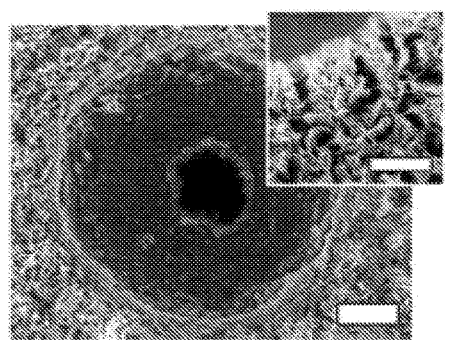
Figure 24C:
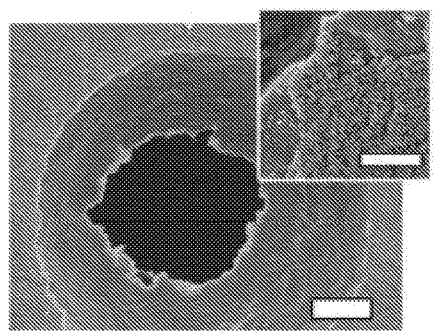
Figure 28A:
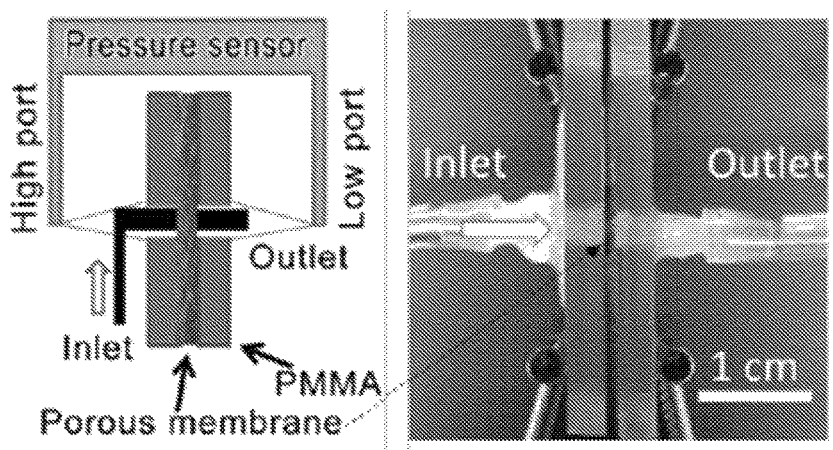
FIG. 28A shows an experimental set-up used to measure the pressure drop during infiltration with gas-liquid mixed flow in accordance with certain embodiments.
Figure 28B:
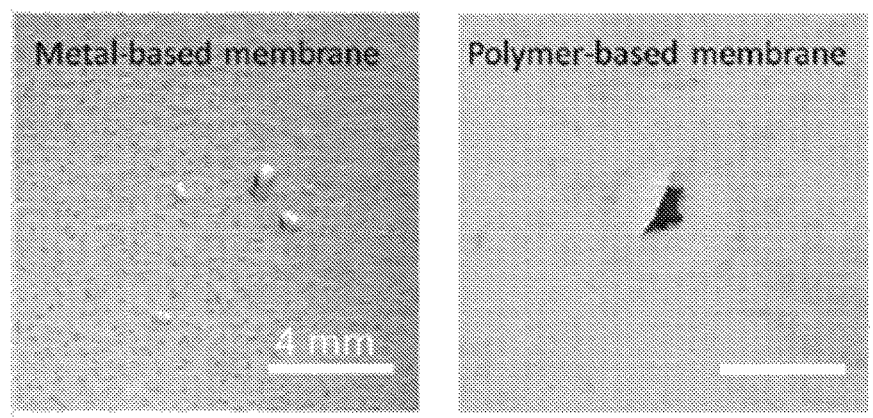
FIG. 28B shows greater robustness of wetting liquid-filled metallic porous membrane over wetting liquid-filled paper porous membranes in accordance with certain embodiments.

The experimental set-up used to measure the pressure drop during infiltration with gas-liquid mixed flow is presented in FIG. 28A. When injected with DI water, the raw stainless steel membranes perform as designed, demonstrating no degradation in their performance even with a transmembrane pressure higher than $2\times10^5$ Pa (FIG. 28B, left). The pore diameter of the metal-based membrane can be easily adjusted from a few micrometers to hundreds of micrometers depending on the etching time under the same galvanostatic conditions and further fine-tuning by electrochemical deposition of micro/nanoscale porous metal oxide films (FIG. 24A to 24C). Such flexibility of the fabrication method for varying (or tuning) pore size allows adjustment of the transmembrane pressure properties, while polymer-based membranes have been already ruptured at $10^5$ Pa (FIG. 28B, right). To emphasize transport difference through various metal-based membranes, the transmembrane pressures for air passing through the membrane is equal to zero at the injecting flow rate of 1000 µL min$^{-1}$ for membranes with pore sizes of tenths of micrometers (FIG. 28C), while for water it will keep increasing at the same injecting flow rate. With the decreased membrane pore size, the transmembrane pressure for air passing through the membrane increases until getting a certain balance based on the pore size and the infusing flow rate (FIG. 28D). When the pore size approaches a value of $10^{-6}$ m, the transmembrane pressure for both air and water transport increases rapidly (FIG. 28E).

It is worth mentioning that there is a remarkably different phenomenon between the balance pressures of the conventional bare metal-based membranes (FIG. 28D) and the threshold pressure of the wetting-liquid filled metal membranes. Although the transmembrane pressure change trends similarly during continuous infusion of mixed air/water flow, in the former, both flow components are going through the non-gating mechanism (FIG. 28C to 28E). In the latter case, both gases and liquids will enter the pore once the applied pressure reaches a critical value dictated by the balance of surface interactions, pore geometry and surface tension.

To further emphasize this difference, we present electrochemical deposition of two metal oxide methods to create wetting-liquid filled metal porous systems (FIG. 29A) that demonstrate feasibility of the various functional approaches to exploit it in a stable and controllable way. FIG. 29B shows air flow through the non-wetting liquid-filled metallic porous membrane (Sample 1) at zero pressure (2901), but adding a gating liquid, which steadily fills the pores, creates a substantial increase in the critical pressure (2903). FIG. 29B also shows liquid-based gating of wetting liquid filled metallic porous membranes, which creates different critical pressures for gas and water within a single system, resulting in making the membrane system with the controllable gas/liquid selectivity. Interestingly, the critical pressure for water transport through the membrane is lower than that of the same stainless steel membrane without the gating liquid. This lower critical pressure means an important advantage of the present embodiment working at lower energy consumption conditions, which is important for the energy-saving practical applications. Moreover, by varying the chemical modification methods, a large variety of the critical pressures for gas/liquid transport can be obtained (FIG. 29C, Sample 2).

In summary, a metal-based wetting liquid-filled membrane systems, which display the advanced feature of providing high pressure stability, controllable gas/liquid selectivity and antifouling properties together with intrinsic mechanical durability and corrosion resistance is achieved. By creating different pore sizes and using various electrochemical and chemical modification approaches, the range of the critical pressures for gas and liquid transport through the wetting liquid-filled porous membranes can be easily controlled. The metal based systems in accordance with certain embodiments can be implemented in a larger variety of potential applications taking into account all these advantages, allowing high pressure stable wetting liquid filled metallic porous membranes.

Permeability Tests: Demonstrating Specific Flow Rates at Specific Transmembrane Pressures In certain embodiments, ASTM D6908-03 standard practice of testing filtration membrane systems can be utilized.

Molecular Weight Cut-Off (MWCO) Determination

In addition to pore size, membranes are broadly characterized based on their molecular weight cut-off (MWCO) described as the molecular weight of the molecule that is 90% retained by the membrane. Utilizing a feed with specific composition, flow rates and transmembrane pressures, and analyzing the permeate by conducting gel permeation chromatography (GPC), MWCO can be determined for wetting liquid-filled porous membranes.

Quantification of Pore Gating Liquid Loss

Any pore gating liquid loss can be investigated to determine extent of leaching of the wetting liquid by conducting thermogravimetric analysis (TGA) after permeability tests and/or MWCO determination.

Upon review of the description and embodiments provided herein, those skilled in the art will understand that modifications and equivalent substitutions may be performed in carrying out the invention without departing from the essence of the invention. Thus, the invention is not meant to be limiting by the embodiments described explicitly above.

What is claimed is:

1. A gating membrane device comprising:
a membrane comprising a plurality of pores, wherein at least one pore of said plurality of pores has a continuous path that traverses a thickness of the membrane, the membrane positioned and arranged to permit a transport fluid to traverse the membrane thickness;
a wetting liquid filling the at least one pore of said plurality of pores,
wherein the wetting liquid partially displaces above a threshold pressure applied across said at least one pore to allow transport of the transport fluid through the membrane while contacting the wetting liquid,
wherein the wetting liquid is selected to be immiscible with the transport fluid, and
wherein the wetting liquid refills the at least one pore and gate transport of the transport fluid across the membrane below the threshold pressure.

2. The gating membrane device of claim 1, wherein the membrane is a polymer, a ceramic, a composite or a metal.

3. The gating membrane device of claim 1, further comprising an inlet and an outlet.

4. The gating membrane device of claim 1, wherein the membrane comprises a fluidic channel.

5. The gating membrane device of claim 4, wherein the fluidic channel is a nanofluidic or microfluidic or a macrofluidic channel.

6. The gating membrane device of claim 4, further comprising an inlet connected to the fluidic channel, an outlet connected to the fluidic channel, and a relief port.

7. The gating membrane device of claim 1, wherein said plurality of pores comprises an average pore size that ranges from 10 nm to 100 microns.

8. The gating membrane device of claim 1, wherein the wetting liquid is immiscible with the transport fluid.

9. The gating membrane device of claim 1, wherein the wetting liquid has a higher affinity to the porous membrane than the transport fluid.

10. The gating membrane device of claim 1, wherein the transport fluid comprises a mixture of different phases that traverse the membrane at different threshold pressures.

11. The gating membrane device of claim 1, wherein the gating membrane device is antifouling.

12. The gating membrane device of claim 1, wherein the transport fluid transports through the at least one pore without contacting the surfaces of the membrane defining the plurality of pores.

13. The gating membrane device of claim 1, wherein the wetting liquid covers at least a portion of the top and bottom surfaces of the membrane.

14. The gating membrane device of claim 1, wherein the wetting liquid is disposed within the membrane.

15. A method for transporting a fluid across a membrane comprising;
providing a membrane comprising a plurality of pores and a wetting liquid,
wherein at least one pore of said plurality of pores has a continuous path that traverses a thickness of the membrane,
wherein the membrane is positioned and arranged to permit a transport fluid to traverse the membrane thickness,
wherein the wetting liquid fills the at least one pore of said plurality of pores, and
wherein the wetting liquid is selected to be immiscible with the transport fluid;
applying a pressure above a threshold pressure across the membrane to displace the wetting liquid in said at least one pore and to transport the transport fluid through said membrane, wherein the transport fluid contacts the wetting liquid; and
lowering the pressure to a pressure below the threshold pressure to allow the wetting liquid to refill the at least one pore.

16. The method of claim 15, wherein the membrane is a polymer, a ceramic, a composite or a metal.

17. The method of claim 15, further comprising:
providing an inlet to apply said pressure and an outlet to receive the transport fluid which traversed across the membrane.

18. The method of claim 15, wherein the membrane comprises a fluidic channel.

19. The method of claim 18, wherein the fluidic channel is a nanofluidic, microfluidic or a macrofluidic channel.

20. The method of claim 18, further comprising:
providing an inlet to the fluidic channel;
providing an outlet to the fluidic channel, and
providing a relief port.

21. The method of claim 15, wherein said plurality of pores comprises an average pore size that ranges from 10 nm to 100 microns.

22. The method of claim 15, wherein the wetting liquid is immiscible with the transport fluid.

23. The method of claim 15, wherein the wetting liquid has a higher affinity to the porous membrane than the transport fluid.

24. The method of claim 15, wherein the transport fluid comprises a mixture of different phases that traverse the membrane at different threshold pressures.

25. The method of claim 15, wherein the membrane is antifouling.

26. The method of claim 15, wherein the transport fluid transports through the pore without contacting the surfaces of the membrane defining the plurality of pores.

27. The method of claim 15, wherein the wetting liquid covers at least a portion of the top and bottom surfaces of the membrane.

28. The method of claim 15, wherein the wetting liquid is disposed within the membrane.

* * * * *